US011956780B2

(12) United States Patent
Lee et al.

(10) Patent No.: US 11,956,780 B2
(45) Date of Patent: Apr. 9, 2024

(54) METHOD AND DEVICE FOR TRANSMITTING AND RECEIVING HARQ-ACK INFORMATION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/106,406

(22) Filed: Feb. 6, 2023

(65) Prior Publication Data

US 2023/0189263 A1    Jun. 15, 2023

Related U.S. Application Data

(63) Continuation of application No. PCT/KR2022/006775, filed on May 11, 2022.

(30) Foreign Application Priority Data

May 11, 2021  (KR) .................. 10-2021-0060584

(51) Int. Cl.
*H04W 72/00* (2023.01)
*H04L 1/00* (2006.01)
(Continued)

(52) U.S. Cl.
CPC ....... *H04W 72/1273* (2013.01); *H04L 1/0061* (2013.01); *H04L 1/1812* (2013.01); *H04W 72/23* (2023.01)

(58) Field of Classification Search
CPC .............. H04W 72/1273; H04W 72/23; H04L 1/0061; H04L 1/1812
See application file for complete search history.

(56) References Cited

U.S. PATENT DOCUMENTS

2022/0279454 A1* 9/2022 Papasakellariou .... H04L 1/1858
2022/0322292 A1* 10/2022 Takeda .................. H04W 72/30
(Continued)

FOREIGN PATENT DOCUMENTS

KR    10-2021-0006965 A    1/2021

OTHER PUBLICATIONS

Intel Corporation, "NR MBS Group Scheduling for RRC_CONNECTED UEs", R1-2103050, 3GPP TSG RAN WG1 #104bis-e, e-Meeting, Apr. 12-20, 2021, see sections 2.3 and 2.5.
(Continued)

*Primary Examiner* — John D Blanton
(74) *Attorney, Agent, or Firm* — BRYAN CAVE LEIGHTON PAISNER LLP

(57) ABSTRACT

Disclosed are a method and a device for transmitting and receiving HARQ-ACK information in a wireless communication system. A method of transmitting HARQ-ACK information according to one embodiment of the present disclosure may comprise the steps of: receiving, from a base station, configuration information related to a HARQ-ACK report on a multicast physical downlink shared channel (PDSCH), wherein, on the basis of the configuration, an ACK/negative ACK (NACK)-based HARQ-ACK report or a NACK-only-based HARQ-ACK report is configured for each of one or more identifiers configured in a terminal; receiving, from the base station, downlink control information (DCI) including a cyclic redundancy check (CRC) scrambled by a specific identifier form among the one or more identifiers; receiving, from the base station, the mul-
(Continued)

ticast PDSCH on the basis of the DCI; and transmitting, to the base station, HARQ-ACK information on the multicast PDSCH on a first physical uplink control channel (PUCCH) on the basis of the NACK-only-based HARQ-ACK report configured for the specific identifier.

14 Claims, 12 Drawing Sheets

(51) Int. Cl.
  *H04L 1/1812* (2023.01)
  *H04W 72/1273* (2023.01)
  *H04W 72/23* (2023.01)

(56) References Cited

U.S. PATENT DOCUMENTS

2022/0322313 A1* 10/2022 Zhang .................... H04W 4/06
2022/0322397 A1* 10/2022 Liu ....................... H04L 1/1896
2022/0377771 A1* 11/2022 Park ...................... H04L 5/0055

OTHER PUBLICATIONS

NTT DOCOMO, Inc., "Discussion on group scheduling mechanism for RRC_CONNECTED UEs", R1-210 3594, 3GPP TSG-RAN WG1 #104bis-e, e-Meeting, Apr. 12-20, 2021, see sections 2.1 and 2.3.
Ericsson, "Discussion on reliability mechanisms for NR MBS", R1-2103739, 3GPP TSG-RAN WG1 Meeting #104bis-e, e-Meeting, Apr. 12-20, 2021, see section 2.1.5.
Samsung, "On mechanisms to improve reliability for RRC_CONNECTED UEs", R1-2101235, 3GPP TSG RAN WG1 #104-e, e-Meeting, Jan. 25-Feb. 5, 2021, see section 2.1.

* cited by examiner

METHOD AND DEVICE FOR TRANSMITTING AND RECEIVING HARQ-ACK INFORMATION IN WIRELESS COMMUNICATION SYSTEM

CROSS-REFERENCE TO RELATED APPLICATIONS

This application is a Continuation Application of International Application No. PCT/KR2022/006775, filed on May 11, 2022, which claims the benefit of earlier filing date and right of priority to Korean Application No. 10-2021-0060584, filed on May 11, 2021, the contents of which are all hereby incorporated by reference herein in their entirety.

TECHNICAL FIELD

The present disclosure relates to a wireless communication system, and in more detail, relates to a method and an apparatus of transmitting and receiving HARQ (Hybrid Automatic Repeat and request)-ACK (acknowledgement) information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting one or more HARQ-ACK information through one or more physical uplink control channels (PUCCHs).

A technical object of the present disclosure is to provide a method and an apparatus for transmitting and receiving ACK/negative (NACK)-based HARQ-ACK and/or NACK-only based HARQ-ACK for a multicast physical downlink shared channel (PDSCH).

A technical object of the present disclosure is to provide a method and an apparatus for configuring a PUCCH when ACK/NACK-based HARQ-ACK and/or NACK-only based HARQ-ACK are configured for multicast PDSCH reception.

The technical objects to be achieved by the present disclosure are not limited to the above-described technical objects, and other technical objects which are not described herein will be clearly understood by those skilled in the pertinent art from the following description.

A method of transmitting hybrid automatic repeat and request (HARQ)-acknowledgment (ACK) information in a wireless communication system according to an aspect of the present disclosure, the method performed by a user equipment (UE) may include: receiving, from a base station, configuration information related to HARQ-ACK reporting for a multicast physical downlink shared channel (PDSCH), wherein based on the configuration information, ACK/NACK (negative ACK) based HARQ-ACK reporting or NACK-only based HARQ-ACK reporting is configured for each of one or more identifiers configured in the UE; receiving, from the base station, downlink control information (DCI) with a cyclic redundancy check (CRC) scrambled by a specific identifier among the one or more identifiers; receiving, from the base station, a multicast PDSCH based on the DCI; and based on NACK-only based HARQ-ACK reporting being configured for the specific identifier, transmitting, to the base station, HARQ-ACK information for the multicast PDSCH on a first physical uplink control channel (PUCCH).

A method of receiving hybrid automatic repeat and request (HARQ)-acknowledgment (ACK) information in a wireless communication system according to an additional aspect of the present disclosure, the method performed by a base station may include: transmitting, to a user equipment (UE), configuration information related to HARQ-ACK reporting for a multicast physical downlink shared channel (PDSCH), wherein based on the configuration information, ACK/NACK (negative ACK) based HARQ-ACK reporting or NACK-only based HARQ-ACK reporting is configured for each of one or more identifiers configured in the UE; transmitting, to the UE, downlink control information (DCI) with a cyclic redundancy check (CRC) scrambled by a specific identifier among the one or more identifiers; transmitting, to the UE, a multicast PDSCH based on the DCI; and based on NACK-only based HARQ-ACK reporting being configured for the specific identifier, receiving, from the UE, HARQ-ACK information for the multicast PDSCH on a first physical uplink control channel (PUCCH).

According to an embodiment of the present disclosure, when transmitting one or more HARQ-ACKs to one or more PUCCHs, ambiguity can be prevented so that a base station can accurately interpret HARQ-ACK information.

In addition, according to an embodiment of the present disclosure, an ACK/NACK-based HARQ-ACK and a NACK-only-based HARQ-ACK may be configured for each UE identifier (e.g., RNTI) according to service requirements.

In addition, according to an embodiment of the present disclosure, when multiple HARQ-ACKs are transmitted on a PUCCH of the same slot, by multiplexing, dropping, bundling, or deferring transmission of a plurality of HARQ-ACKs, even when a UE reports a plurality of HARQ-ACKs, a base station can accurately interpret HARQ-ACK information.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
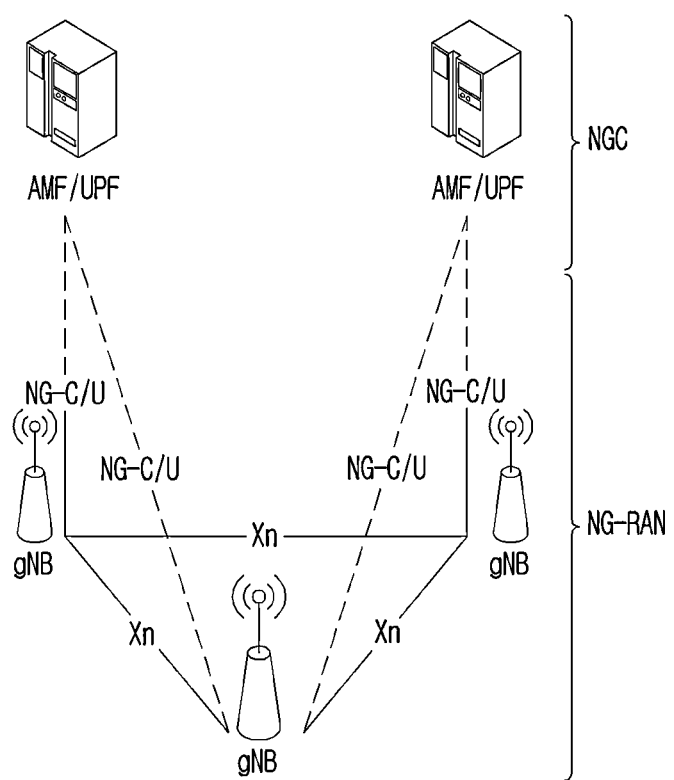
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
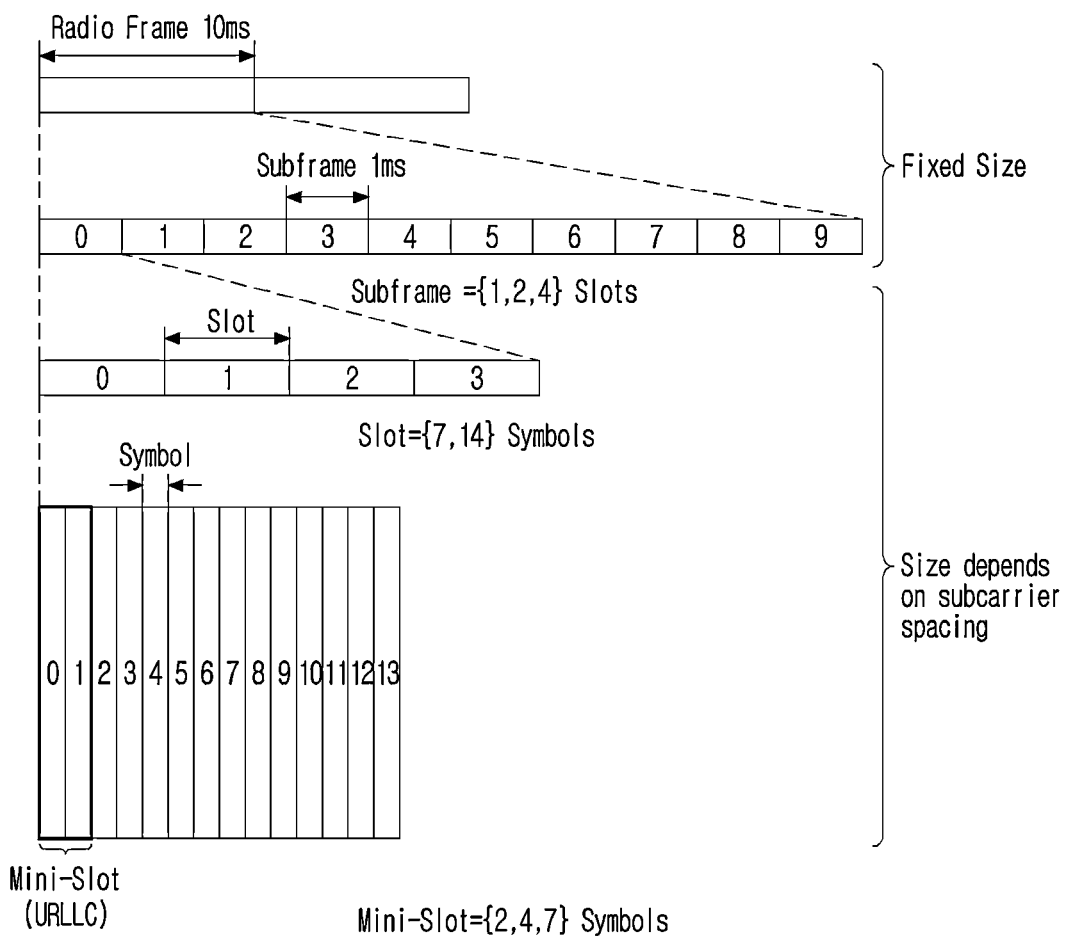
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ · 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,μ}$) and the number of slots per subframe ($N_{slot}^{frame,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
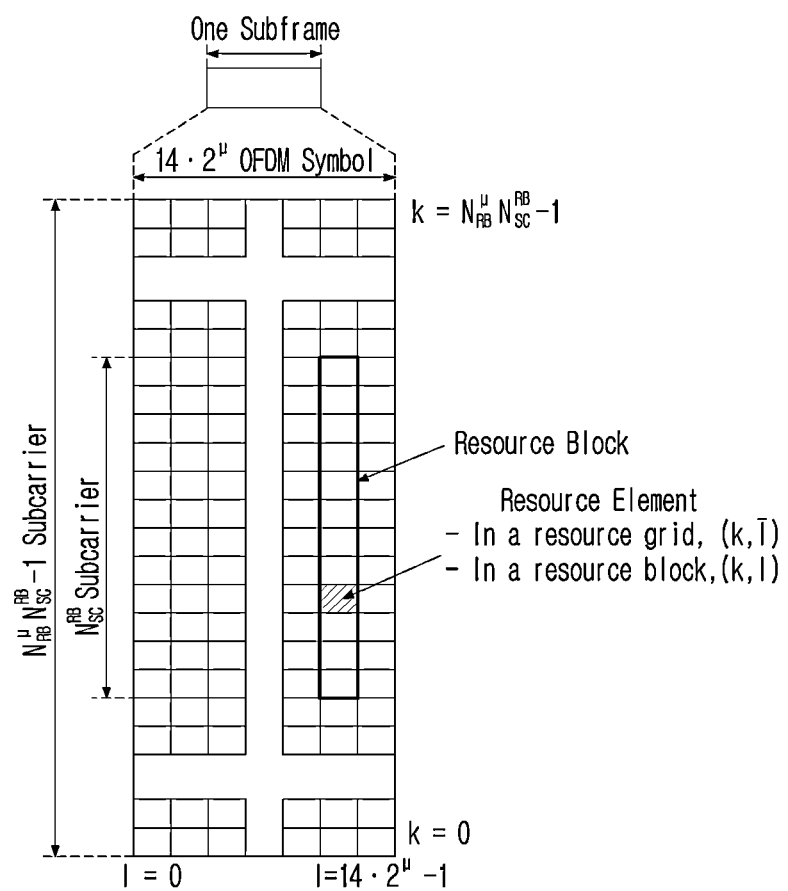
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with 14·$2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for p and an antenna port p is referred to as a resource element and is uniquely identified by an index pair (k,l'). Here, k=0, ..., $N_{RB}^μ N_{sc}^{RB}-1$ is an index in a frequency domain and l'=0, ..., $2^μ N_{symb}^{(μ)}-1$ refers to a position of a symbol in a subframe. When referring to a resource element in a slot, an index pair (k,l) is used. Here, l=0, ..., $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,1) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
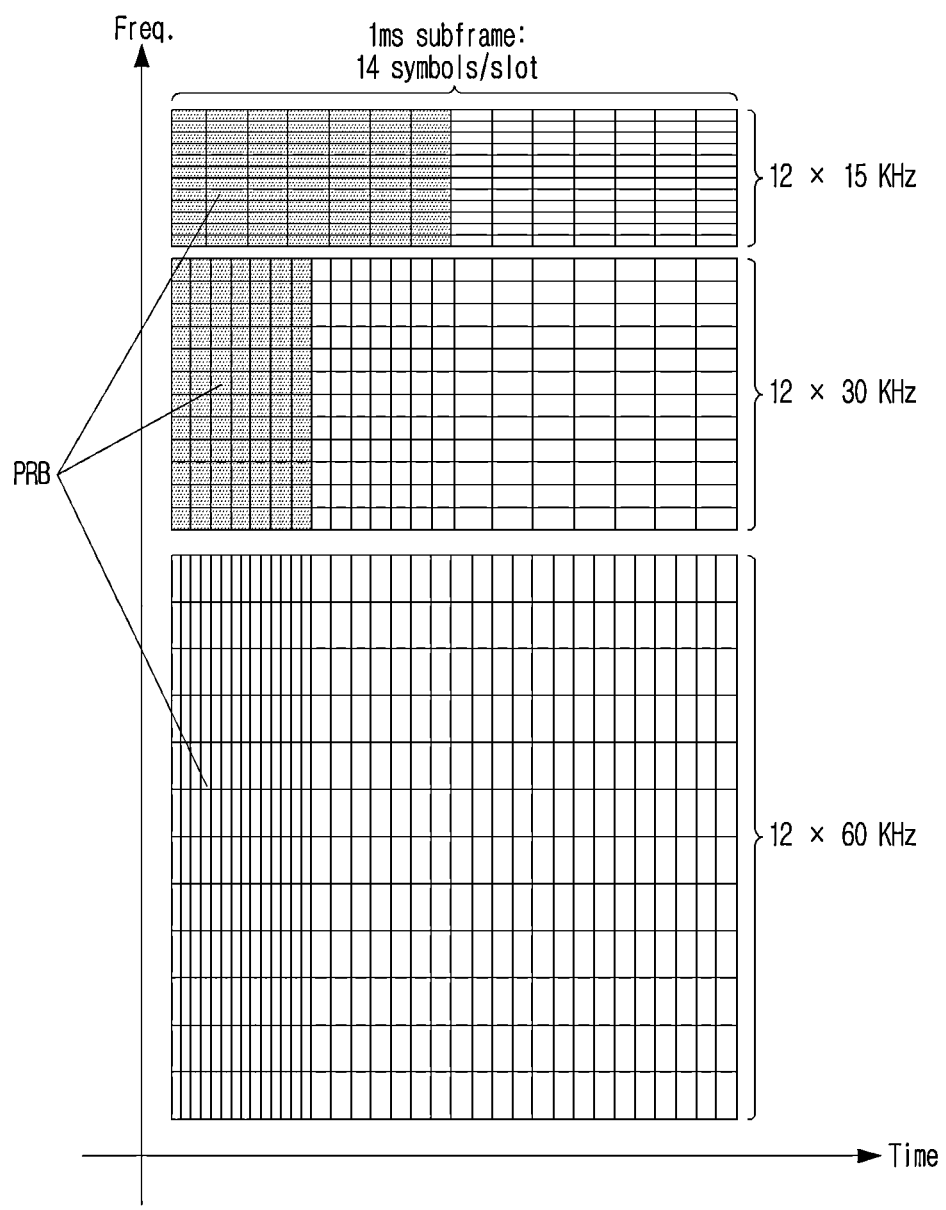
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
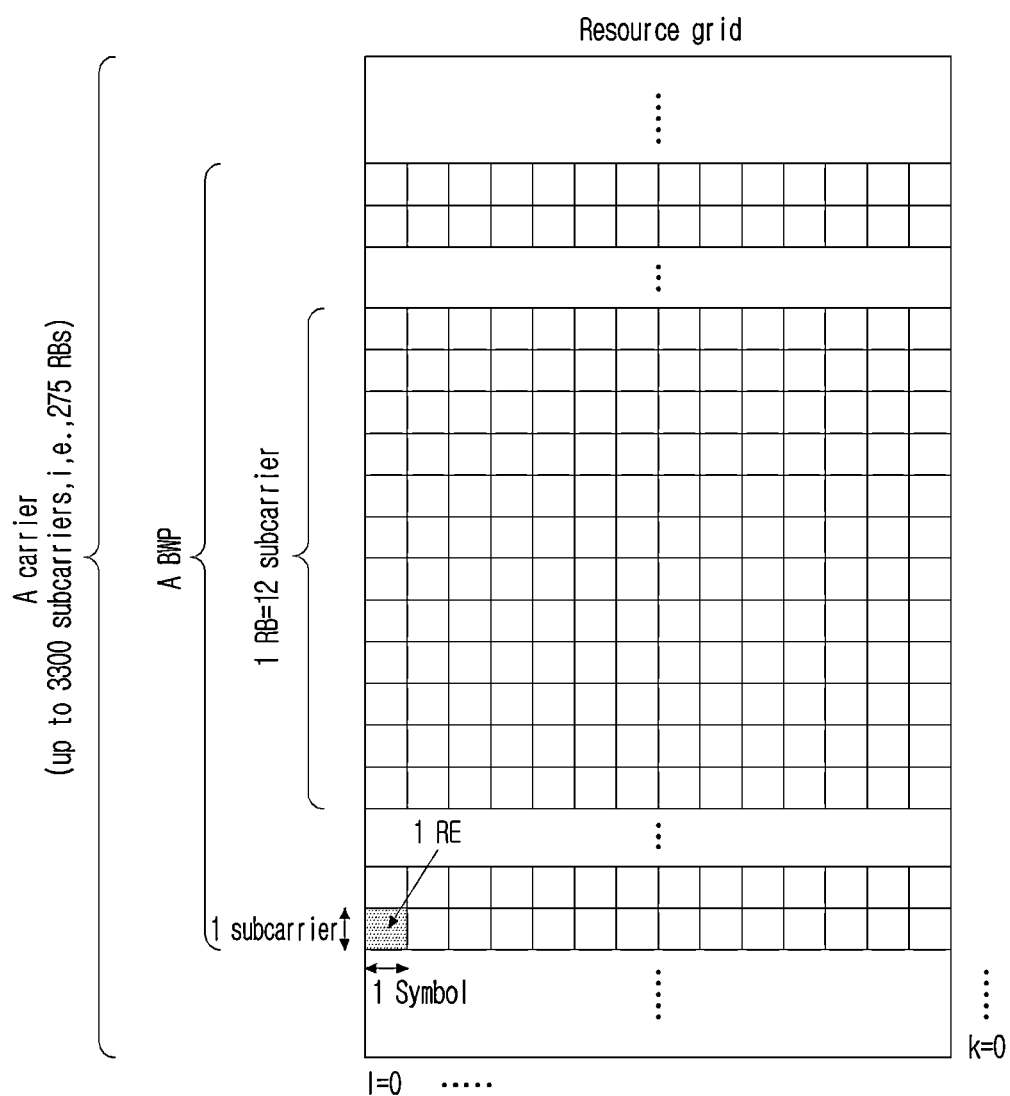
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
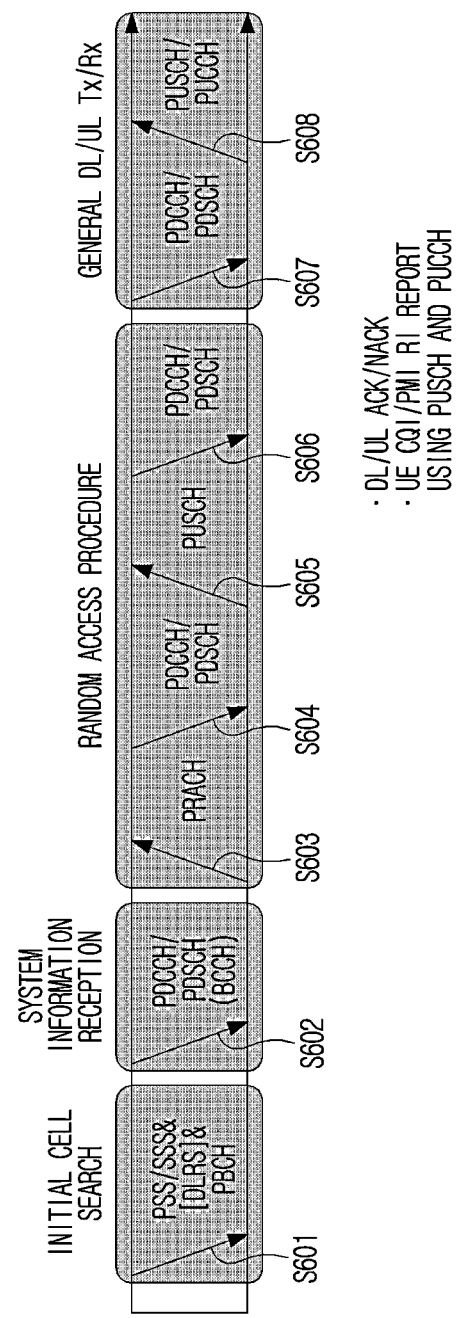
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 01 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}

'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
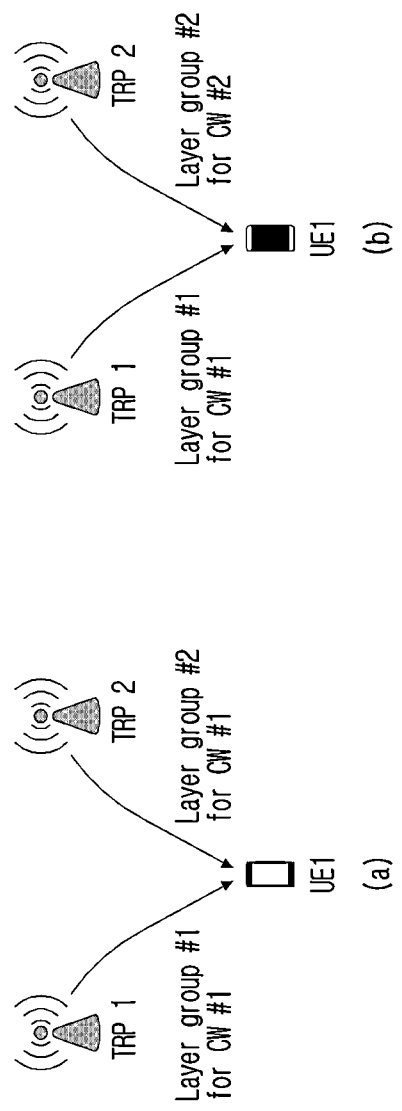
FIG. 7 illustrates a method of multiple TRPs transmission in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs.

Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRP scheduled by at least one DCI may be performed as follows:

i) Scheme 1 (SDM): n (n is a natural number) TCI states in a single slot in overlapping time and frequency resource allocation
  Scheme 1a: Each transmission occasion is one layer or set of layers of the same TB, and each layer or set of layers is associated with one TCI and one set of DMRS port(s). A single codeword with one redundancy version (RV) is used for all layers or sets of layers. For a UE, different coded bits are mapped to different layers or sets of layers with specific mapping rules.
  Scheme 1b: Each transmission occasion is one layer or set of layers of the same TB, and each layer or set of layers is associated with one TCI and one set of DMRS port(s). A single codeword with one RV is used for each spatial layer or set of layers. RVs corresponding to each spatial layer or set of layers may be the same or different.
  Scheme 1c: Each transmission occasion is one layer of the same TB having one DMRS port associated with multiple TCI state indices or one layer of the same TB with multiple DMRS ports associated with multiple TCI indices in turn (one by one).

In schemes 1a and 1c described above, the same MCS is applied to all layers or sets of layers.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) is associated with all non-overlapping frequency resource allocations.
  Scheme 2a: A single codeword with one RV is used across an entire resource allocation. For UE, a common RB mapping (mapping of codeword to layer) is applied across all resource allocations.
  Scheme 2b: A single codeword with one RV is used for each non-overlapping frequency resource allocation. RVs corresponding to each non-overlapping frequency resource allocation may be the same or different.

In scheme 2a, the same MCS is applied to all non-overlapping frequency resource allocations.

iii) Scheme 3 (TDM): n (n is a natural number) TCI states in a single slot in non-overlapping time resource allocation. Each transmission occasion of a TB has one TCI and one RV with time granularity of a mini-slot. All transmission occasion(s) in a slot use a common MCS with the same single or multiple DMRS port(s). An RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

Hereinafter, in the present disclosure, DL MTRP-URLLC means that M-TRPs transmit the same data (e.g., transport block, TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that M-TRPs receive the same data/UCI from UE by using a different layer/time/frequency resource. For example, TRP 1 receives the same data/UCI from UE in resource 1 and TRP 2 receives the same data/UCI from UE in resource 2 and shares received data/UCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of an SRS resource indicated by an SRI (SRS resource indicator) field of UL grant DCI. Alternatively, it may mean an OL (open loop) Tx power control parameter connected to a value indicated by a SRI field of UL grant DCI (j: an index for open loop parameter Po and alpha (α) (up to 32 parameter value sets per cell), q_d: an index of a DL RS resource for PL (pathloss) measurement (measurement of up to 3 per cell), l: a closed loop power control process index (up to 2 processes per cell)).

On the other hand, it is assumed that MTRP-eMBB means that M-TRPS transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different transmission configuration indication (TCI) state. That is, when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure below, the meaning that a plurality of base stations (i.e., MTRP) repetitively transmits the same PDCCH may mean the same DCI is transmitted by a plurality of PDCCH candidates, and it is equivalent with the meaning that a plurality of base stations repetitively transmits the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI. Here, if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure below, when a plurality of base stations (i.e., MTRP) divide and transmit the same PDCCH, it may mean that one DCI is transmitted through one PDCCH candidate, but TRP 1 transmits some resources in which the PDCCH candidate is defined and TRP 2 transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits the PDCCH candidate 1 and TRP 2 transmits the PDCCH candidate 2 using different time/frequency resources. After receiving the PDCCH candidate 1 and the PDCCH candidate 2, a UE generates a PDCCH candidate corresponding to aggregation level m1+m2 and attempts DCI decoding.

When the same DCI is divided and transmitted to several PDCCH candidates, there may be two implementation methods.

First, a DCI payload (control information bits+CRC) may be encoded through one channel encoder (e.g., a polar encoder), coded bits obtained as a result may be divided into two TRPs and transmitted. In this case, an entire DCI payload may be encoded in coded bits transmitted by each TRP, or only a part of a DCI payload may be encoded. Second, a DCI payload (control information bits+CRC) may be divided into two (DCI 1 and DCI 2) and each can be encoded through a channel encoder (e.g., polar encoder). Thereafter, two TRPs may transmit coded bits corresponding to DCI 1 and coded bits corresponding to DCI 2, respectively.

In summary, it may be as follows that a plurality of base stations (i.e., MTRP) divide/repeat the same PDCCH and transmit over a plurality of monitoring occasions (MO).

i) it may mean that each base station (i.e., STRP) repeatedly transmits coded DCI bits obtained by encoding all DCI contents of a corresponding PDCCH through each MO; or, ii) it may mean that coded DCI bits obtained by encoding all DCI contents of a corresponding PDCCH are divided into a plurality of parts, and each base station (i.e., STRP) transmits a different part through each MO; or iii) it may mean that DCI contents of a corresponding PDCCH are divided into a plurality of parts, and each base station (i.e., STRP) separately encodes different parts and transmits them through each MO.

That is, it may be understood that a PDCCH is transmitted multiple times over several transmission occasions (TO) regardless of repeated transmission or divided transmission of the PDCCH. Here, a TO means a specific time/frequency resource unit in which a PDCCH is transmitted. For example, if a PDCCH is transmitted multiple times (in a specific resource block (RB)) over slots 1, 2, 3, and 4, a TO may mean each slot, or if a PDCCH is transmitted multiple times (in a specific slot) over RB sets 1, 2, 3, and 4, a TO may mean each RB set, or if a PDCCH is transmitted multiple times over different times and frequencies, a TO may mean each time/frequency resource. In addition, a TCI state used for DMRS channel estimation for each TO may be configured differently, and it may be assumed that TOs in which a TCI state is configured differently are transmitted by different TRPs/panels. When a plurality of base stations repeatedly transmits or dividedly transmits a PDCCH, it means that the PDCCH is transmitted over a plurality of TOs, and the union of TCI states configured in corresponding TOs is configured with two or more TCI states. For example, if a PDCCH is transmitted over TOs 1,2,3,4, TCI states 1,2,3,4 may be configured in each of TOs 1,2,3,4, respectively, which means that TRP i transmits cooperatively a PDCCH in TO i.

For a plurality of TOs indicated to a UE to repeatedly transmit or dividedly transmit a PDCCH/PDSCH/PUSCH/PUCCH, UL transmits to a specific TRP or DL receives from a specific TRP in each TO. Here, a UL TO (or TO of TRP 1) transmitted to TRP 1 means a TO using the first value among two spatial relations, two UL TCIs, two UL power control parameters and/or two pathloss reference signals (PLRS) indicated to a UE, and a UL TO (or TO of TRP 2) transmitted to TRP 2 means a TO using the second value among two spatial relations, two UL TCIs, two UL power control parameters and/or two PLRSs indicated to a UE. Similarly, for DL transmission, a DL TO (or TO of TRP 1) transmitted by TRP 1 means a TO using the first value among two DL TCI states (e.g., when two TCI states are configured in CORESET) indicated to a UE, and a DL TO (or TO of TRP 2) transmitted by TRP 2 means a TO using the second value among two DL TCI states (e.g., when two TCI states are configured in CORESET) indicated to a UE.

The proposal of the present disclosure can be extended and applied to various channels such as PUSCH/PUCCH/PDSCH/PDCCH.

The proposal of the present disclosure can be extended and applied to both a case of repeated transmission and a case of divided transmission the channel on different time/frequency/spatial resources.

Figure 8:
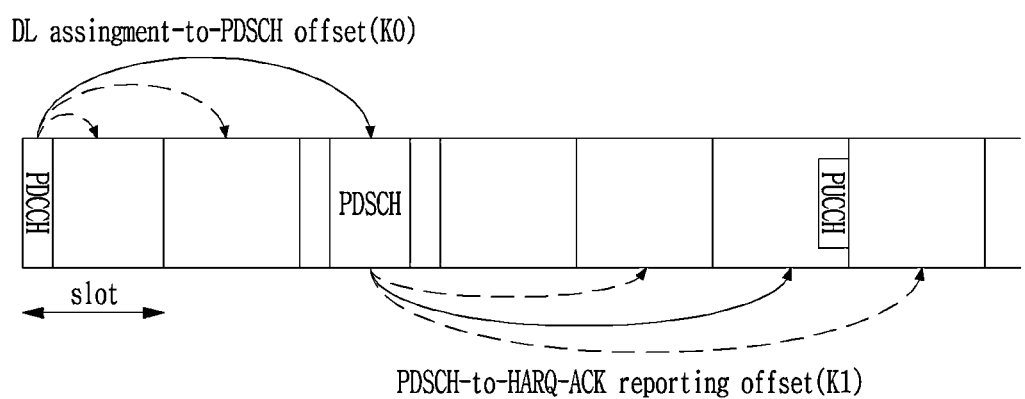
FIG. 8 illustrates a HARQ-ACK process for downlink data in a wireless communication system to which the present disclosure can be applied.

Data Transmission and HARQ (Hybrid Automatic Repeat and Request)-ACK (Acknowledgement) Process FIG. 8 illustrates a HARQ-ACK process for downlink data in a wireless communication system to which the present disclosure can be applied.

Referring to FIG. 8, a UE may detect a PDCCH in slot #n. Here, a PDCCH includes downlink scheduling information (e.g., DCI formats 1_0 and 1_1), and a PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: Indicates an RB resource (e.g., one or more (dis)contiguous RBs) allocated to a PDSCH Time domain resource assignment: K0, indicating a start position (e.g., OFDM symbol index) and a length (e.g., number of OFDM symbols) of a PDSCH in a slot PDSCH HARQ feedback timing indicator (PDSCH-to-HARQ_feedback timing indicator): Indicates K1

HARQ process number (4 bits): Indicates HARQ process ID (Identity) for data (e.g., PDSCH, TB)

PUCCH resource indicator (PRI): Indicates a PUCCH resource to be used for UCI transmission among a plurality of PUCCH resources in a PUCCH resource set Thereafter, a UE may receive a PDSCH in slot #(n+K0) according to scheduling information of slot #n, and then transmit UCI through a PUCCH in slot #(n+K1). Here, UCI includes a HARQ-ACK response for a PDSCH. If a PDSCH is configured to transmit up to 1 TB, a HARQ-ACK response may be composed of 1-bit. When a PDSCH is configured to transmit up to two TBs, a HARQ-ACK response may be composed of 2-bits if spatial bundling is not configured and 1-bit if spatial bundling is configured. When a HARQ-ACK transmission time for a plurality of PDSCHs is designated as slot #(n+K1), UCI transmitted in slot #(n+K1) includes HARQ-ACK responses for a plurality of PDSCHs.

Multimedia Broadcast/Multicast Service (MBMS)

3GPP MBMS can be divided into i) a single frequency network (SFN) method in which a plurality of base station cells are synchronized to transmit the same data through a physical multicast channel (PMCH) and ii) SC-PTM (Single Cell Point To Multipoint) method broadcasting within a cell coverage through a PDCCH/PDSCH channel. The SFN method is used to provide broadcasting services over a wide area (e.g., MBMS area) through semi-statically allocated resources, while the SC-PTM method is mainly used to provide broadcasting services only within a cell coverage through dynamic resources.

The SC-PTM provides one logical channel, an SC-MCCH (Single Cell Multicast Control Channel) and one or a plurality of logical channels, an SC-MTCH (Single Cell Multicast Traffic Channel). These logical channels are mapped to a downlink shared channel (DL-SCH), which is a transport channel, and a PDSCH, which is a physical channel. A PDSCH transmitting SC-MCCH or SC-MTCH data is scheduled through a PDCCH indicated by a group-RNTI (G-RNTI). In this case, a temporary multicast group ID (TMGI) corresponding to a service identifier (ID) may be mapped one-to-one with a specific G-RNTI value. Therefore, if a base station provides multiple services, multiple G-RNTI values may be allocated for SC-PTM transmission. One or a plurality of UEs may perform PDCCH monitoring using a specific G-RNTI to receive a specific service. Here, a DRX on-duration period may be configured exclusively for an SC-PTM for a specific service/specific G-RNTI. In this case, the UEs wake up only for a specific on-duration period and perform PDCCH monitoring for the G-RNTI.

Method of Transmitting One or Multiple PUCCH for ACK/NACK Based or NACK only Based HARQ-ACK PUCCH: Physical Uplink Control channel
PUSCH: Physical Uplink Shared Channel
MCCH: Multicast Control Channel
MTCH: Multicast Traffic Channel
RRM: Radio resource management
RLM: Radio link monitoring
SCS: Sub-carrier spacing
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
TDRA: Time Domain Resource Allocation
SLIV: Starting and Length Indicator Value (An indication value for a starting symbol index and the number of symbols in a slot of a PDSCH and/or a PUSCH. It may be configured as a component of an entry constituting a TDRA field in a PDCCH that schedules a corresponding PDSCH and/or PUSCH.)
BWP: BandWidth Part (It may be composed of continuous resource blocks (RBs) on a frequency axis. It may correspond to one numerology (e.g., SCS, CP length, slot/mini-slot duration, etc.). In addition, a plurality of BWPs may be configured in one carrier (the number of BWPs per carrier may also be limited), but the number of activated BWPs may be limited to a part (e.g., one) per carrier.)
CORESET: control resource set (CONtrol REsourse SET) (It means a time-frequency resource region in which a PDCCH can be transmitted, and the number of CORESETs per BWP may be limited.)
REG: Resource element group
SFI: Slot Format Indicator (An indicator indicating a symbol level DL/UL direction within a specific slot(s), transmitted through a group common PDCCH).
COT: Channel occupancy time
SPS: Semi-persistent scheduling
QCL: Quasi-Co-Location (A QCL relationship between two reference signals (RS) may mean that a QCL parameter obtained from one RS such as a Doppler shift, a Doppler spread, an average delay, a delay spread, a spatial Rx parameter, etc. can also be applied to another RS (or antenna port(s) of a corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For certain DL RS antenna port(s), a first DL RS may be configured as a reference for QCL type X (X=A, B, C, or D), and a second DL RS may be configured as a reference for QCL type Y (Y=A, B, C, or D, but X≠Y).)
TCI: Transmission Configuration Indication (One TCI state includes a QCL relationship between DM-RS ports of a PDSCH, DM-RS ports of a PDCCH, or CSI-RS port(s) of a CSI-RS resource and one or more DL RSs. For 'Transmission Configuration Indication' among fields in DCI that schedules a PDSCH, a TCI state index corresponding to each code point constituting the field is activated by a MAC control element (CE), and a TCI state configuration for each TCI state index is configured through RRC signaling. In the Rel-16 NR system, a corresponding TCI state is configured between DL RSs, but a configuration between a DL RS and a UL RS or between a UL RS and a UL RS may be allowed in a future release. Examples of a UL RS include an SRS, a PUSCH DM-RS, and a PUCCH DM-RS.)
SRI: SRS resource indicator (It indicates one of SRS resource index values configured in 'SRS resource indicator' among fields in DCI scheduling a PUSCH. When transmitting a PUSCH, a UE may transmit the PUSCH using the same spatial domain transmission filter used for transmission and reception of a reference signal associated with the corresponding SRS resource. Here, a reference RS is configured by RRC signaling through an SRS spatial relation information parameter (SRS-SpatialRelationInfo) for each SRS resource, and an SS/PBCH block, a CSI-RS, or an SRS may be configured as the reference RS.)
TRP: Transmission and Reception Point
PLMN ID: Public Land Mobile Network identifier
RACH: Random Access Channel
RAR: Random Access Response
Msg3: This is a message transmitted through an uplink shared channel (UL-SCH) including a C-RNTI MAC CE or a common control channel (CCCH) service data unit (SDU), provided from a higher layer, and associated with a UE Contention Resolution Identity as part of a random access procedure.
Special Cell: In case of a dual connectivity operation, the term special cell refers to the PCell of a master cell group (MCG) or the PSCell of a secondary cell group (SCG) depending on whether a MAC entity is related to the MCG or the SCG, respectively. Otherwise, the term Special Cell refers to the PCell. The Special Cell supports PUCCH transmission and contention-based random access and is always active.
Serving Cell: It includes the PCell, the PSCell, and the secondary cell (SCell).
CG: Configured Grant
Type 1 CG or Type 2 CG: Type 1 configured grant or Type 2 configured grant
Fall-back DCI: It indicates a DCI format that can be used for a fall-back operation, and for example, corresponds to DCI formats 0_0 and 1_0.
non-fall-back DCI: It indicates a DCI format other than the fall-back DCI, for example, corresponds to DCI formats 0_1 and 1_1.
SS: search space
FDRA: frequency domain resource allocation
TDRA: time domain resource allocation
LP, HP: Low(er) priority, High(er) priority
A/N for cell A: A/N (acknowledgement/negative acknowledgment) information for data (e.g., PDSCH) received in cell A
UL CI: Uplink cancelation indication
CFR: Common frequency resource for multicast and broadcast service (MBS). One DL CFR provides group common PDCCH and group common PDSCH transmission resources for MBS transmission and reception. One UL CFR provides HARQ-ACK PUCCH resources for group common PDSCH reception. One CFR is one MBS specific BWP or one UE specific BWP. Alternatively, one or a plurality of CFRs may be configured in one UE specific BWP. One CFR is associated with one UE specific BWP.
TMGI: Temporary Mobile Group Identity. As an MBS service identifier, it indicates a specific service.
G-RNTI: Group Radio Network Temporary Identifier. It indicates a UE group identifier that receives an MBS.

The above contents (3GPP system, frame structure, NR system, etc.) can be applied in combination with methods proposed in the present disclosure to be described later, or it may be supplemented to clarify the technical characteristics of the methods proposed in the present disclosure. In this disclosure, '/' means 'and', 'or', or 'and/or' depending on the context.

In the prior art, a base station may configure a UE-specific SPS configuration for a specific UE and allocate a repeated downlink SPS transmission resource according to a configured period. Here, DCI of a UE-specific PDCCH may indicate activation (SPS activation) of a specific SPS configuration index, and accordingly, the corresponding UE can repeatedly receive an SPS transmission resource according to a configured period. This SPS transmission resource is used for initial HARQ (hybrid automatic repeat request) transmission, and a base station may allocate a retransmission resource of a specific SPS configuration index through DCI of a UE-specific PDCCH. For example, when a UE reports a HARQ NACK for an SPS transmission resource, a base station can allocate a retransmission resource to DCI so that a UE can receive downlink retransmission. In addition, DCI of a UE-specific PDCCH may indicate deactivation (SPS release or SPS deactivation) of a specific SPS configuration index, and a UE receiving this does not receive the indicated SPS transmission resource. Here, a cyclic redundancy check (CRC) of DCI for activation/retransmission/deactivation of the SPS is scrambled with Configured Scheduling-RNTI (CS-RNTI).

Rel-17 NR intends to introduce a DL broadcast or DL multicast transmission method to support a Multicast Broadcast Service (MBS) service similar to LTE MBMS. A base station provides a point-to-multipoint (PTM) transmission method and/or a point-to-point (PTP) transmission method for DL broadcast or DL multicast transmission.

In a PTM transmission method for an MBS, a base station transmits a group common PDCCH and a group common PDSCH to a plurality of UEs, and a plurality of UEs simultaneously receive the same group common PDCCH and group common PDSCH transmission to decode the same MBS data.

On the other hand, in a PTP transmission scheme for an MBS, a base station transmits a UE-specific PDCCH and a UE-specific PDSCH to a specific UE, and only the corresponding UE receives the UE-specific PDCCH and the UE-specific PDSCH. Here, when there are a plurality of UEs receiving the same MBS service, a base station separately transmits the same MBS data to individual UEs through different UE-specific PDCCHs and UE-specific PDSCHs. That is, the same MBS data is provided to a plurality of UE, but different channels (i.e., PDCCH, PDCCH) are used for each UE.

As described above, in a PTM transmission method, a base station transmits a plurality of group common PDSCHs to a plurality of UEs. Here, a base station can receive UE's HARQ-ACKs for a group common PDSCH through respective UE-dedicated PUCCH resources from a plurality of UEs. In addition, a UE may receive group common SPS transmission (i.e., static scheduling transmission) and group common dynamic scheduling transmission (dynamically scheduled transmission). In addition, it is also possible to receive group common SPS transmission and UE-only static/dynamic scheduling transmission. In this case, a situation may occur in which a UE transmits HARQ-ACKs for these transmissions together in the same slot or sub-slot. For example, PUCCH resource(s) for group common/dedicated SPS and PUCCH resource(s) for group common/dedicated dynamic scheduling transmission may be allocated to the same slot or the same sub-slot. In this case, HARQ-ACK transmissions for two or more transmissions may be multiplexed and transmitted on one PUCCH, or some HARQ-ACKs may be dropped (not sent), bundled, or delayed. Therefore, a problem occurs in that a base station cannot correctly interpret HARQ-ACK information.

Therefore, in the present disclosure, when a plurality of HARQ-ACKs are transmitted on a PUCCH of the same slot (or sub-slot), a method of transmitting a plurality of HARQ-ACKs, such as multiplexing, dropping, bundling, or delaying a plurality of (or some) HARQ-ACKs, is proposed.

Hereinafter, in the present disclosure, a DCI format (or PDCCH) for scheduling PDSCH reception carrying an MBS service (i.e., MBS TB) may be referred to as an MBS DCI format (or PDCCH) or a multicast DCI format (or PDCCH). For example, a DCI format (or PDCCH) with a CRC scrambled by a group-RNTI (G-RNTI) or a group-configured scheduling-RNTI (G-CS-RNTI) may be referred to as an MBS DCI format (or PDCCH) or a multicast DCI format (or PDCCH). Here, unless otherwise stated in the present disclosure, an MBS DCI format (or PDCCH) or a multicast DCI format (or PDCCH) may include both a group common DCI format (or PDCCH) according to a PTM method for an MBS and a UE-specific DCI format (or PDCCH) according to a PTP method for an MBS.

In addition, unless otherwise stated in the present disclosure (e.g., distinction between a PDSCH by dynamic scheduling and a PDSCH by SPS), a PDSCH (also, a PDSCH scheduled by a UE specific DCI format (or PDCCH) of a PTP method) scheduled by an MBS DCI format (or PDCCH) or a multicast DCI format (or PDCCH) and a group common SPS PDSCH may be collectively referred to as an MBS PDSCH or a multicast PDSCH. In other words, unless otherwise stated in the present disclosure, an MBS PDSCH or a multicast PDSCH may include both a group common PDSCH according to a PTM scheme for an MBS and a UE specific PDSCH according to a PTP scheme for an MBS.

In addition, HARQ-ACK information associated with a multicast (or MBS) DCI format (or PDCCH) or a multicast PDSCH may be referred to as MBS HARQ-ACK information or multicast HARQ-ACK information. Unless otherwise stated in this disclosure, such MBS HARQ-ACK information or multicast HARQ-ACK information may be transmitted through a UE specific PUCCH/PUSCH according to a PTP/PTM scheme and may be transmitted through a group common PUCCH/PUSCH according to a PTM scheme.

In addition, unless otherwise stated in the present disclosure (e.g., distinction between a PDSCH by dynamic scheduling and a PDSCH by SPS), a PDSCH scheduled by a unicast DCI format (or PDCCH) and a UE-specific SPS PDSCH may be collectively referred to as a unicast/UE-specific PDSCH.

In addition, in the present disclosure, when a transport block (TB) for an MBS PDSCH or a multicast PDSCH is successfully decoded, a UE may transmit an ACK as HARQ-ACK information. On the other hand, if a TB for an MBS PDSCH or a multicast PDSCH is not successfully decoded, a UE may transmit a NACK as HARQ-ACK information. This HARQ-ACK transmission method is referred to as an ACK/NACK based HARQ-ACK method (mode).

On the other hand, when a TB for an MBS PDSCH or a multicast PDSCH is successfully decoded, a UE may not transmit HARQ-ACK information (i.e., ACK) through a PUCCH (or PUSCH). On the other hand, if a TB for an MBS PDSCH or a multicast PDSCH is not successfully decoded, a UE may transmit a NACK as HARQ-ACK information. This HARQ-ACK transmission method is referred to as an ACK/NACK based HARQ-ACK method (mode). In other words, when a NACK only based HARQ-ACK method (mode) is configured, a UE may not perform PUCCH (or PUSCH) transmission in case of an ACK, and may perform PUCCH (or PUSCH) transmission only in case of a NACK.

In addition, in the present disclosure, a sub-slot, a mini-slot, and a symbol slot all represent time units smaller than one slot, and unless clearly distinguished and described for each in the present disclosure, all may be interpreted in the same meaning. Also, all of the above terms may be regarded/interpreted as one or more symbols in a slot.

The present disclosure supports the following schemes.

When multiple unicast HACK-ACK(s) of high priority (HP) for unicast PDSCH(s), X multicast HARQ-ACK(s) of HP for multicast PDSCH(s), Y multicast HARQ-ACK(s) of LP for multicast PDSCH(s) overlap in the same slot, a UE may transmit PUCCH(s) as follows.

1) Option 1: A UE supporting two time division multiplexed PUCCHs may transmit two PUCCHs in the slot (e.g., when PUCCH configuration for multicast (e.g., RRC parameter 'PUCCH-Config') and PUCCH configuration for unicast (e.g., PUCCH-Config) are separately configured).

Option 1-1: A UE may transmit one PUCCH (some multicast HARQ-ACKs may or may not be dropped) carrying a separate HARQ-ACK codebook for multiplexed multicast HARQ-ACK(s) and one PUCCH carrying a separate HARQ-ACK codebook for unicast HARQ-ACK(s).

Option 1-2: A UE may transmit one PUCCH for multiplexed multicast HARQ-ACK(s) (some multicast HARQ-ACKs may or may not be dropped), and may transmit one PUCCH for multiplexed multicast HARQ-ACK(s) and unicast HARQ-ACK(s).

2) Option 2: A UE that does not support two PUCCHs (e.g., when PUCCH configuration (e.g., PUCCH-Config) for multicast is not separately configured) may transmit only one PUCCH and drop the other PUCCH.

3) Option 3: According to a UE capability or a maximum PUCCH payload size, a UE may drop all or part of multicast HARQ-ACK(s) with LP.

4) Option 4: A UE may defer all or part of multicast HARQ-ACK(s) to the next PUCCH transmission (e.g., depending on whether PUCCH configuration for multicast (e.g., PUCCH-Config) and PUCCH configuration for unicast (e.g., PUCCH-Config) are separately configured), and transmit the remaining unicast/multicast HARQ-ACK(s) on a PUCCH in the current slot.

Option 4-1: Z (Z is a natural number) multicast HARQ-ACK (s) may be deferred to the next PUCCH transmission allocated for a unicast or other multicast PDSCH. Deferred multicast HARQ-ACK(s) may be multiplexed with next unicast HARQ-ACK(s) and/or other multicast HARQ-ACK(s).

Option 4-2: Z (Z is a natural number) multicast HARQ-ACK(s) may be deferred to the next PUCCH transmission allocated for other multicast PDSCH(s) (not unicast PDSCH) (e.g., when PUCCH configuration (e.g., PUCCH-Config) for multicast is separately configured).

5) Option 5: A UE may bundle multicast HARQ-ACK(s) and unicast HARQ-ACK(s).

Option 5-1: Z (Z is a natural number) multicast HARQ-ACK(s) may be bundled with K (K<Z) HARQ-ACK bit(s).

Option 5-2: Z (Z is a natural number) multicast HARQ-ACK(s) and unicast HARQ-ACK(s) may be bundled with K (K<Z) HARQ-ACK bit(s) (e.g., when PUCCH configuration (e.g., PUCCH-Config) for multicast is not separately configured).

Meanwhile, i) in the case of two PUCCH transmissions of multicast HARQ-ACK(s) and unicast HARQ-ACK(s), respectively or ii) in the case of multiplexing multicast HARQ-ACK(s) and unicast HARQ-ACK(s) on one PUCCH, if a PUCCH of N symbol slots for unicast HARQ-ACK(s) is determined, a PUCCH of N symbol slots should also be determined for multicast HARQ-ACK(s). If a PUCCH of N symbol slots cannot be determined for multicast HARQ-ACK(s) (e.g., when a PUCCH with N symbol slot(s) is not configured in a PUCCH configuration (e.g., PUCCH-Config) for multicast), multicast HARQ-ACK(s) may be dropped or deferred. Alternatively, if a PUCCH with N symbol slot(s) cannot be determined for multicast HARQ-ACK(s) based on a PUCCH configuration (e.g., PUCCH-Config) for multicast, a PUCCH with N symbol slot(s) for multicast HARQ-ACK(s) may be determined based on a PUCCH configuration (e.g., PUCCH-Config) for unicast.

Meanwhile, when a UE triggers a random access procedure (RACH), the UE monitors a group common PDCCH and receives a group common PDSCH as follows:

1) After triggering a RACH, a UE monitors a group common PDCCH.

When a RACH is triggered, a UE suspends group common PDCCH monitoring and group common PDSCH reception.

A UE resumes group common PDCCH reception after one of MSG1, MSG2, MSG3, and MSG4 of step 4 RACH or one of MSGA and MSGB of step 2 RACH.

In case of step 4 RACH, a UE prioritizes MSG1, MSG2, MSG3, and MSG4 over group common PDCCH/PDSCH reception and HARQ-ACKs for a group common PDSCH.

In case of step 2 RACH, a UE prioritizes MSGA and MSGB over group common PDCCH/PDSCH reception and HARQ-ACKs for a group common PDSCH.

2) A UE may transmit an MBS HARQ-ACK on a PUCCH immediately after MSG2/MSGB reception (in case of contention-free RACH (CF-RACH)) or first MSG3 transmission (contention-based RACH (CB-RACH)).

A UE cannot transmit an MBS HARQ-ACK without UL synchronization.

MSG3 is not multiplexed with a PUCCH A/N.

A UE cannot perform a HARQ-ACK before MSG3 (or MSG2/MSGB), but can perform a HARQ-ACK after MSG3 (or MSG2/MSGB).

Hereinafter, a HARQ-ACK transmission method proposed in the present disclosure will be described.

In the present disclosure, an MBS HARQ-ACK (or multicast HARQ-ACK) means a HARQ-ACK for PTM PDSCH-based MBS service downlink transmission and/or a HARQ-ACK for PTP PDSCH-based MBS service downlink transmission.

Figure 9:
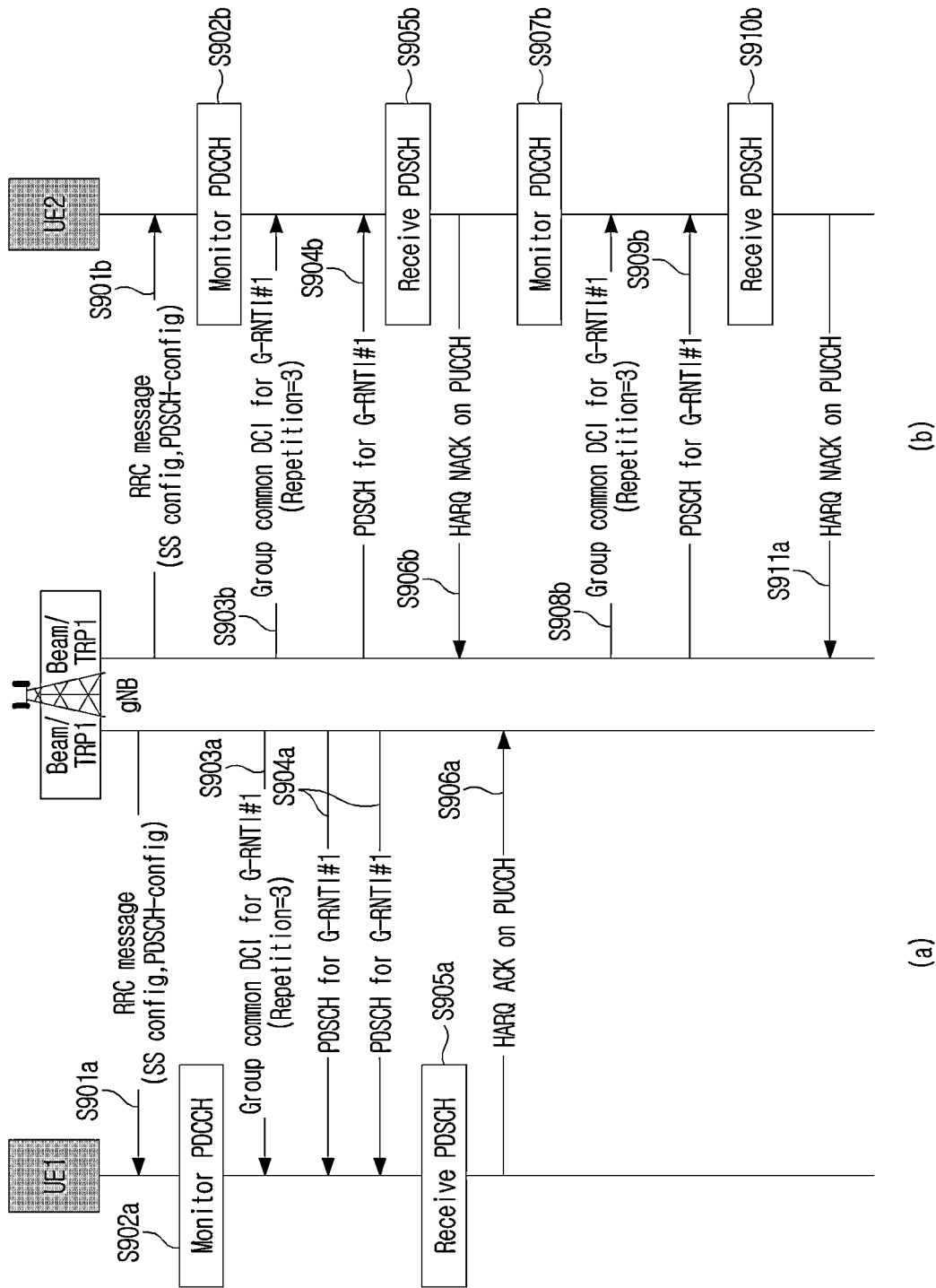
FIG. 9 illustrates a HARQ-ACK transmission and reception procedure according to an embodiment of the present disclosure.

FIG. 9 illustrates a HARQ-ACK transmission and reception procedure according to an embodiment of the present disclosure.

FIG. 9 (a) illustrates a signaling procedure between UE1 and a base station (gNB) (beam/TRP 1), and FIG. 9(b) illustrates a signaling procedure between UE2 and a base station (gNB) (beam/TRP 2). In addition, FIG. 9(a) illustrates a case without PDSCH retransmission, and FIG. 9(b) illustrates a case with PDSCH retransmission. In FIG. 9, for convenience of description, two procedures are illustrated together, but the present disclosure is not limited thereto. That is, UE1 and UE2 are not limited to accessing the same base station (through different beams/TRPs), and are not limited to performing the two procedures together. In other words, although FIGS. 9(a) and 9(b) are separate procedures, they are shown together for convenience of explanation, and common descriptions are described for common steps.

1. Although not shown in FIG. 9, (before the procedure of FIG. 9), a UE may enter an RRC connected mode (RRC_CONNECTED mode) and may transmit a messages/information that indicates one or more MBS services of interest to a base station.

A. The message/information may be transmitted through any one of uplink control information (UCI), a MAC control element (CE), and an RRC message.

B. An interested MBS service in the message/information may mean either TMGI or G-RNTI included in a DL message received from a base station.

For example, the DL message may be a service availability message including TMGI #1, TMGI #3, TMGI #5 and TMGI #10. If a UE is interested in TMGI #5, the UE may indicate an order of TMGI #5 in the message/information. That is, the UE may report '3' to the base station.

As another example, the DL message may be a service availability message including G-RNTI #1, G-RNTI #3, G-RNTI #5 and G-RNTI #10. If a UE is interested in G-RNTI #10, the UE may indicate an order of G-RNTI #10 in the message/information. That is, the UE may report '4' to the base station.

2. Referring to FIG. 9, upon receiving the message/information, a base station may transmit at least one of i) a common frequency resource (CFR) configuration, ii) one or more group common PDSCH configurations including TCI states for one or more G-RNTI value(s), iii) a search space (SS) configuration including TCI states for one or more G-RNTI value(s) to the UE through an RRC message (S901a, S901b).

Although one RRC message is illustrated in FIG. 9, it is not limited thereto, and the configurations i) to iii) may be provided to a UE through different (or partially identical) RRC messages.

Upon receiving an RRC message from a base station, a UE may configure one or more group common PDSCH (e.g., group common SPS PDSCH) configurations according to the RRC message.

A. An RRC message may be a group common message transmitted on a PTM multicast control channel (MCCH) or a UE-specific message transmitted on a UE-specific dedicated control channel (DCCH).

B. A UE may be configured with at least a G-RNTI value for each MBS CFR or each serving cell. Alternatively, in addition to this, a GC-CS-RNTI (group common-configured scheduling-RNTI) may also be configured, and may be used for activating, retransmitting, or releasing one or more group common SPS configurations.

if a UE has not configured with a GC-CS-RNTI for a CFR or a serving cell, when a CS-RNTI has been configured for the CFR or the serving cell, the UE may use the CS-RNTI to activate, retransmit or release one or more group common SPS configurations.

A base station may associate a list of TMGIs or a list of G-RNTIs with one GC-CS-RNTI. In this case, a base station may provide a UE with a list of TMGIs or a list of G-RNTIs associated with the GC-CS-RNTI value.

C. Each PDSCH configuration (e.g., RRC parameter PDSCH-config) may include at least information elements (IE) for multicast and/or broadcast as shown in Table 6 below.

Table 6 illustrates the PDSCH-Config IE used to configure PDSCH parameters.

Table 7 illustrates a description of the fields of the PDSCH-config of FIG. 6 above.

TABLE 7

PDSCH-Config field descriptions dataScramblingIdentityPDSCH, dataScramblingIdentityPDSCH2
Identifier(s) used to initialize data scrambling (c_init) for
PDSCH. The dataScramblingIdentityPDSCH2 is configured if
coresetPoolIndex is configured with 1 for at least one
CORESET in the same BWP.
dmrs-DownlinkForPDSCH-MappingTypeA, dmrs-DownlinkForPDSCH-
MappingTypeA-DCI-1-2
DMRS configuration for PDSCH transmissions using PDSCH
mapping type A (chosen dynamically via PDSCH-
TimeDomainResourceAllocation). Only the fields dmrs-Type,
dmrs-AdditionalPosition and maxLength may be set differently
for mapping type A and B. The field dmrs-DownlinkForPDSCH-
MappingTypeA applies to DCI format 1_1 and the field dmrs-
DownlinkForPDSCH-MappingTypeA-DCI-1-2 applies to DCI format
1_2.
dmrs-DownlinkForPDSCH-MappingTypeB, dmrs-DownlinkForPDSCH-
MappingTypeB-DCI-1-2
DMRS configuration for PDSCH transmissions using PDSCH
mapping type B (chosen dynamically via PDSCH-
TimeDomainResourceAllocation). Only the fields dmrs-Type,
dmrs-AdditionalPosition and maxLength may be set differently
for mapping type A and B. The field dmrs-DownlinkForPDSCH-
MappingTypeB applies to DCI format 1_1 and the field dmrs-
DownlinkForPDSCH-MappingTypeB-DCI-1-2 applies to DCI format
1_2.
maxNrofCodewordsScheduledByDCI
Maximum number of code words that a single DCI may schedule.
This changes the number of MCS/RV/NDI bits in the DCI message
from 1 to 2.
mcs-Table, mcs-TableDCI-1-2
Indicates which MCS table the UE shall use for PDSCH. If the
field is absent the UE applies the value 64QAM. The field
mcs-Table applies to DCI format 1_0 and DCI format 1_1, and
the field mcs-TableDCI-1-2 applies to DCI format 1_2.
pdsch-AggregationFactor
Number of repetitions for data. When the field is absent the
UE applies the value 1.
pdsch-TimeDomainAllocationList, pdsch-
TimeDomainAllocationListDCI-1-2
List of time-domain configurations for timing of DL
assignment to DL data.

TABLE 6

```
PDSCH-Config ::= SEQUENCE {
  dataScramblingIdentityPDSCH INTEGER (0..1023) OPTIONAL, -- Need S
  dmrs-DownlinkForPDSCH-MappingTypeA SetupRelease { DMRS-DownlinkConfig }
  OPTIONAL, -- Need M
  dmrs-DownlinkForPDSCH-MappingTypeB SetupRelease { DMRS-DownlinkConfig }
  OPTIONAL, -- Need M
  tci-StatesToAddModList SEQUENCE (SIZE(1..maxNrofTCI-States)) OF TCI-State
  OPTIONAL, -- Need N
  tci-StatesToReleaseList SEQUENCE (SIZE(1..maxNrofTCI-States)) OF TCI-
  StateId OPTIONAL, -- Need N
  vrb-ToPRB-Interleaver ENUMERATED {n2, n4} OPTIONAL, -- Need S
  resourceAllocation ENUMERATED { resourceAllocationType0,
  resourceAllocationType1, dynamicswitch},
  pdsch-TimeDomainAllocationList SetupRelease { PDSCH-
  TimeDomainResourceAllocationList } OPTIONAL, -- Need M
  pdsch-AggregationFactor ENUMERATED { n2, n4, n8 } OPTIONAL, -- Need S
  rateMatchPatternToAddModList SEQUENCE (SIZE
  (1..maxNrofRateMatchPatterns)) OF RateMatchPattern OPTIONAL, -- Need N
  rateMatchPatternToReleaseList SEQUENCE (SIZE
  (1..maxNrofRateMatchPatterns)) OF RateMatchPatternId OPTIONAL, -- Need N
  rateMatchPatternGroup1 RateMatchPatternGroup OPTIONAL, -- Need R
  rateMatchPatternGroup2 RateMatchPatternGroup OPTIONAL, -- Need R
  rbg-Size ENUMERATED {config1, config2},
  mcs-Table ENUMERATED {qam256, qam64LowSE} OPTIONAL, -- Need S
  maxNrofCodeWordsScheduledByDCI ENUMERATED {n1, n2}
  ...
}
```

TABLE 7-continued

PDSCH-Config field descriptions

The field pdsch-TimeDomainAllocationList (with or without
suffix) applies to DCI format 1_0 and DCI format 1_1, and if
the field pdsch-TimeDomainAllocationListDCI-1-2 is not
configured, to DCI format 1_2. If the field pdsch-
TimeDomainAllocationListDCI-1-2 is configured, it applies to
DCI format 1_2.
The network does not configure the pdsch-
TimeDomainAllocationList-r16 simultaneously with the pdsch-
TimeDomainAllocationList (without suffix) in the same PDSCH-
Config.
rateMatchPatternGroup1, rateMatchPatternGroup1DCI-1-2
The IDs of a first group of RateMatchPatterns defined in
PDSCH-Config->rateMatchPatternToAddModList (BWP level) or in
ServingCellConfig ->rateMatchPatternToAddModList (cell
level). These patterns can be activated dynamically by DCI.
The field rateMatchPatternGroup1 applies to DCI format 1_1,
and the field rateMatchPatternGroup1DCI-1-2 applies to DCI
format 1_2.
rateMatchPatternGroup2, rateMatchPatternGroup2DCI-1-2
The IDs of a second group of RateMatchPatterns defined in
PDSCH-Config->rateMatchPatternToAddModList (BWP level) or in
ServingCellConfig ->rateMatchPatternToAddModList (cell
level). These patterns can be activated dynamically by DCI.
The field rateMatchPatternGroup2 applies to DCI format 1_1,
and the field rateMatchPatternGroup2DCI-1-2 applies to DCI
format 1_2.
rateMatchPatternToAddModList
Resources patterns which the UE should rate match PDSCH
around. The UE rate matches around the union of all resources
indicated in the rate match patterns.
rbg-Size
Selection between config 1 and config 2 for RBG size for
PDSCH. The UE ignores this field if resourceAllocation is set
to resourceAllocationType1.
resourceAllocation, resourceAllocationDCI-1-2
Configuration of resource allocation type 0 and resource
allocation type 1 for non-fallback DCI. The field
resourceAllocation applies to DCI format 1_1, and the field
resourceAllocationDCI-1-2 applies to DCI format 1_2.
resourceAllocationType1GranularityDCI-1-2
Configure the scheduling granularity applicable for both the
starting point and length indication for resource allocation
type 1 in DCI format 1_2. If this field is absent, the
granularity is 1 PRB.
tci-StatesToAddModList
A list of Transmission Configuration Indicator (TCI) states
indicating a transmission configuration which includes QCL-
relationships between the DL RSs in one RS set and the PDSCH
DMRS ports.
vrb-ToPRB-Interleaver, vrb-ToPRB-InterleaverDCI-1-2
Interleaving unit configurable between 2 and 4 PRBs. When the
field is absent, the UE performs non-interleaved VRB-to-PRB
mapping.

3. Although not shown in FIG. 9, for HARQ-ACK transmission of whether reception of MBS transmission is successful, a base station may preconfigure a PUCCH configuration (e.g., PUCCH-config) to a UE through a higher layer message (e.g., RRC message). Here, when a UE receives an MBS service, a base station may preconfigure a PUCCH configuration for separate multicast for an MBS HARQ-ACK to a UE in addition to a PUCCH configuration for unicast provided in the prior art.

A. In addition, a base station may separately provide a PUCCH configuration for multicast (e.g. PUCCH-config) and a PUCCH configuration for unicast (e.g. PUCCH-config) to a UE through a higher layer message (e.g., RRC message).

Here, for a PUCCH resource ID in a PUCCH configuration (e.g., PUCCH-config) for multicast in a higher layer message (e.g., RRC message), 'NACK only based HARQ-ACK' may be configured. Here, an ACK/NACK-based HARQ-ACK reporting (mode) means a method (mode) in which a UE transmits an ACK or a NACK to a base station according to whether decoding of a TB is successful, and a NACK only based HARQ-ACK reporting (mode) means a method (mode) in which HARQ-ACK information including only ACK values is not transmitted through a PUCCH. An ACK/NACK based HARQ-ACK reporting (mode) may be referred to as a first HARQ-ACK reporting (mode), and a NACK only based HARQ-ACK reporting (mode) may be referred to as a second HARQ-ACK reporting (mode).

If a NACK only based HARQ-ACK is not configured for a PUCCH resource ID, a UE may consider that an ACK/NACK based HARQ-ACK is configured for the PUCCH resource ID.

A PUCCH resource indicator (PRI) value of DCI may indicate (select) a PUCCH resource ID of a PUCCH configuration (e.g., PUCCH-config) for multicast, and may implicitly indicate a NACK only based HARQ-ACK or an ACK/NACK based HARQ-ACK for the corresponding PUCCH resource ID.

Here, a NACK only based HARQ-ACK may not be configured by a PUCCH configuration for unicast (e.g., PUCCH-config).

If both a NACK-only based HARQ-ACK and an ACK/NACK based HARQ-ACK are configuration for a group common SPS configuration, RRC signaling, DCI or MAC CE can enable/disable only one of a NACK-only based HARQ-ACK and an ACK/NACK based HARQ-ACK for the group common SPS configuration.

In addition, When both a NACK-only based HARQ-ACK and an ACK/NACK based HARQ-ACK are configured for a group common PDSCH dynamically scheduled by DCI with a CRC scrambled by one of a C-RNTI, a CS-RNTI, a G-RNTI and a G-CS-RNTI, RRC signaling or DCI (or MAC CE) can enable/disable only one of a NACK-only based HARQ-ACK and an ACK/NACK based HARQ-ACK for a group common PDSCH (e.g., for one of C-RNTI, CS-RNTI, G-RNTI and G-CS-RNTI). In other words, one method (mode) of a NACK-only based HARQ-ACK and an ACK/NACK based HARQ-ACK for one of a C-RNTI, a CS-RNTI, a G-RNTI and a G-CS-RNTI may be configured by RRC signaling or DCI (or MAC CE). In this case, when a UE receives DCI with a CRC scrambled by one of a C-RNTI, a CS-RNTI, a G-RNTI and a G-CS-RNTI, one of a NACK-only based HARQ-ACK and an ACK/NACK based HARQ-ACK configured (active) for a corresponding C-RNTI, a CS-RNTI, a G-RNTI and a G-CS-RNTI may be configured/determined as a HARQ-ACK reporting method for a multicast or unicast PDSCH scheduled by the corresponding DCI.

B. A PUCCH configuration (e.g., PUCCH-config) for multicast may be configured for each CFR or for each active UL BWP of a UE related to a CFR.

C. Group common PUCCH resource(s) for a NACK only based HARQ-ACK may be configured within a UL CFR configured within an active UL BWP of a UE.

Here, group common PUCCH resource(s) may be configured only by a PUCCH configuration for multicast (e.g., PUCCH-config).

In addition, UE specific PUCCH resource(s) may be configured on an active BWP of a UE.

D. A NACK only based HARQ-ACK may be transmitted on group common PUCCH resource(s).

E. Different group common PUCCH resource(s) may be related to different DL RSs (e.g., in terms of symbols/slots and/or PRBs and/or sequences for PUCCHs).

F. A NACK only based HARQ-ACK may be configured for a PUCCH resource ID in a PUCCH configuration (e.g., PUCCH-config) for multicast.

If a NACK only based HARQ-ACK is not configured for a PUCCH resource ID, a UE may consider that an ACK/NACK based HARQ-ACK is configured for the PUCCH resource ID.

A PRI value of DCI may indicate (select) a PUCCH resource ID of a PUCCH configuration (e.g., PUCCH-config) for multicast, and may implicitly indicate a NACK only based HARQ-ACK or an ACK/NACK based HARQ-ACK for a corresponding PUCCH resource ID.

Here, a NACK only based HARQ-ACK may not be configured by a PUCCH configuration for unicast (e.g., PUCCH-config).

G. Alternatively, a NACK only based HARQ-ACK may be configured only in a PUCCH configuration (e.g., PUCCH-config) for multicast.

A NACK only based HARQ-ACK cannot be configured with a PUCCH configuration (e.g., PUCCH-config) for unicast.

One of the following options may be used to configure a NACK only based HARQ-ACK within a PUCCH configuration (e.g., PUCCH-config) for multicast.

i) Option 1: A NACK only based HARQ-ACK and an ACK/NACK based HARQ-ACK may be configured for different PUCCH resource set IDs.

ii) Option 2: A NACK only based HARQ-ACK and an ACK/NACK based HARQ-ACK may be configured for different PUCCH resource IDs.

When a NACK only based HARQ-ACK is not configured for a PUCCH resource set ID and/or a PUCCH resource ID, a UE may consider that an ACK/NACK based HARQ-ACK is configured for the corresponding PUCCH resource set ID and/or the corresponding PUCCH resource ID.

4. Referring to FIG. 9 again, when a search space (SS) for a configured CFR is configured, a UE monitors a PDCCH on the SS configured in the CFR configured to receive DCI with a CRC scrambled with a G-RNTI or a G-CS-RNTI (S902a, S902b).

5. If a data unit is available in a Multicast Traffic Channel (MTCH) of an MBS radio bearer (MRB) for an MBS service, according to a service-to-resource mapping, a base station constructs and transmits a transport block (TB) including a data unit for an SPS PDSCH occasion, i) associated with an MTCH of an MRB for an MBS service, ii) associated with a TMGI of an MBS service, iii) associated with a short ID of an MBS service, or iv) associated with a G-RNTI mapped to an MBS service.

In the case of group common dynamic scheduling of a TB, a base station transmits DCI to a UE on a PDCCH (S903a, S903b).

Here, a CRC of the DCI may be scrambled by a G-RNTI, a G-CS-RNTI or a CS-RNTI. Also, a PDCCH may be a group common PDCCH or a UE specific PDCCH.

In FIG. 9, a case in which a group common DCI with a CRC scrambled with G-RNTI #1 is transmitted, and repetition=3 is exemplified.

The DCI may include the following information (fields).

Identifier for DCI format: This information (field) may indicate either an MBS-specific DCI format or one of an existing DCI format for an MBS.

Carrier indicator: This information (field) indicates a (serving or MBS specific) cell of a CFR through which a group common PDCCH/PDSCH is transmitted or a serving cell of an active BWP of a UE associated with the CFR.

Bandwidth part indicator: This information (field) indicates a BWP ID assigned to a CFR through which a group common PDCCH/PDSCH is transmitted or a BWP ID of an active BWP of a UE associated with the CFR.

In addition, the DCI may include information on a frequency domain resource assignment, a time domain resource assignment, a VRB-to-PRB mapping, and a PRB bundling size indicator, a rate matching indicator, a ZP CSI-RS trigger, a modulation and coding scheme, a new data indicator (NDI), a redundancy version, a HARQ process number, a downlink assignment index, a transmit power control (TPC) command for a scheduled PUCCH, a PUCCH resource Indicator (PRI), a PDSCH-to-HARQ_feedback timing indicator (PDSCH-to-HARQ_feedback timing indicator), antenna port(s), a transmission configuration indication (TCI), an SRS request, a DMRS sequence initialization, and a priority indicator.

In the case of group common dynamic scheduling, a base station may provide a UE with one or more of the following service-to-resource mappings for an MBS service identified by a TMGI or a G-RNTI or a GC-CS-RNTI i) by a group common or UE-specific RRC message or ii) by a group common or UE-specific MAC CE. Data of an MBS service can be carried over an MBS radio bearer (MRB) of an MTCH associated with an MBS service, which is a multicast traffic logical channel. An RRC message may be a group common message transmitted through a PTM Multicast Control Channel (MCCH) or a UE-specific message transmitted through a UE-specific Dedicated Control Channel (DCCH). DCI scheduling a PDSCH carrying MBS service data may also indicate one or more of a short ID, an MTCH ID, an MRB ID, a G-RNTI value, and a TMGI value for an MBS service.

6. If a UE receives DCI with a CRC scrambled by a G-RNTI of interest in receiving, based on i) a mapping between MBS services and a HARQ process number (HPN) indicated in DCI and/or ii) (if available) a mapping between MBS services and an indicated short ID(s) in DCI, a UE may determine an MBS service related to one or more of short ID, MTCH ID, MRB ID, G-RNTI value, and TMGI value for each PDSCH occasion.

A base station may transmit a PDSCH carrying corresponding MBS service data to a UE (S904a, S904b) (In FIG. 9, the case where MBS service data mapped with G-RNTI #1 is transmitted is exemplified), and if a UE is interested in the determined MBS service(s), the UE can receive PDSCH transmission scheduled by DCI (S905a, S905b).

On the other hand, different from the example of FIG. 9, if a UE is not interested in the determined MBS service(s), the UE may not receive PDSCH transmission scheduled by DCI.

Then, according to the decoding state of PDSCH transmission, a UE transmits HARQ feedback to a base station.

7. A UE receiving group common DCI indicating PUCCH resource(s) for an MBS HARQ-ACK may transmit a HARQ-ACK to a base station through a PUCCH after receiving a PDSCH scheduled by DCI as follows (S906a).

A. A PUCCH Resource Indicator (PRI) may be indicated as follows by a group common DCI.

1) Option 1A-1: A list of UE specific PRIs may be included in DCI.

Each PRI in a list may indicate an entry corresponding to a candidate PUCCH resource ID (e.g., pucch-ResourceId) value in a PUCCH configuration (e.g. PUCCH-config) for the same PUCCH resource or different PUCCH resource allocation for other UEs of a group receiving the same DCI. Other PRIs of DCI may indicate different entries in a PUCCH configuration (e.g., PUCCH-config).

A candidate PUCCH resource ID (e.g., pucch-ResourceId) value is configured by a higher layer (e.g., RRC), at least in multicast PUCCH configuration (e.g., PUCCH-config), different PUCCH resource ID (e.g., pucch-ResourceId) values may be configured for different UEs of the same group.

2) Option 1A-2: group common PRI may be included in DCI.

A single group common PRI may indicate a corresponding entry for a candidate PUCCH resource ID (e.g., pucch-ResourceId) value in a UE specific PUCCH configuration (e.g., PUCCH-config) for the same or different PUCCH resource allocation for all UEs in a group.

A candidate PUCCH resource ID (e.g., pucch-ResourceId) value is configured by a higher layer (e.g., RRC), at least in PUCCH configuration for multicast (e.g., PUCCH-config), different PUCCH resource ID (e.g., pucch-ResourceId) values may be configured for different UEs of the same group.

B. K1 (PDSCH-to-HARQ_feedback timing indicator) may be indicated by group common DCI as follows.

1) Option 1B-1: A list of UE specific K1 values may be included in DCI.

Each K1 in a list may indicate the same UL slot or different UL (sub)slots for other UEs in a group.

As an example, different K1 values may be assigned to different UEs. For example, K1-UE1, K2-UE2, K3-UE3.

As another example, a K1 value may be shared by multiple UEs (e.g., K1-UE1/UE2, K2-UE3/UE4).

As another example, one K1 value may be a reference and other K1 values may be assigned based on the reference. For example, a list of {K1_ref, K1_offset (offset from reference)} may be indicated in DCI.

For example, UE1 may use K1_ref, UE2 may use K1_ref+K1_offset1, and UE3 may use K1_ref+K1_offset2.

2) Option 1B-2: A group common K1 value may be included in DCI.

A single K1 value may indicate a corresponding entry for a candidate DL data-UL ACK value (e.g., dl-DataToUL-ACK) in a UE specific PUCCH configuration (e.g., PUCCH-config) for the same or different PUCCH resource allocation for all UEs of a group receiving DCI.

A candidate DL data-UL ACK value (e.g., dl-DataToUL-ACK) is configured by a higher layer (e.g., RRC), at least the PUCCH configuration for multicast (e.g., PUCCH-config) can be different for different UEs in the same group.

C. In addition, when receiving group common DCI with a CRC scrambled by a G-RNTI and/or UE specific DCI with a CRC scrambled by a C-RNTI, when a Type-1 HARQ-ACK codebook for a PUCCH-config for multicast and/or a PUCCH-config for unicast is configured, a UE may configure Time Domain Resource Allocation (TDRA) to generate a type 1 HARQ-ACK codebook for HARQ-ACK(s) for a group common PDSCH scheduled by group common DCI and/or a UE specific PDSCH scheduled by UE specific DCI.

D. A UE may configure a TDRA as follows.

1) For DCI reception with a CRC scrambled by a G-RNTI, a UE may configure TDRA as follows.

If a DL data-UL ACK value (e.g., dl-DataToUL-ACK) is not configured in a PUCCH configuration (e.g., PUCCH-config) for multicast, a UE may follow a DL data-UL ACK value (e.g., dl-DataToUL-ACK) in a PUCCH configuration (e.g., PUCCH-config) for unicast (e.g., for codebook construction of multicast received slot/TRP/cell). Here, a UE may configure TDRA based on a K1 set of unicast.

If a DL data-UL ACK value (e.g., dl-DataToUL-ACK) is configured in a PUCCH configuration (e.g., PUCCH-config) for multicast, a UE may follow a DL data-UL ACK value (e.g., dl-DataToUL-ACK) in a PUCCH configuration (e.g., PUCCH-config) for multicast (e.g., for codebook construction of multicast received slot/TRP/cell). Here, a UE may configure TDRA based on a K1 set of multicast.

If a DL data-UL ACK value (e.g., dl-DataToUL-ACK) (e.g., for DCI format 1_1/2) is configured in a PUCCH configuration (e.g., PUCCH-config) for unicast or multicast, a UE may follow a DL data-UL ACK value (e.g., dl-DataToUL-ACK) (e.g., for DCI format 1_1/2) in a PUCCH configuration (e.g., PUCCH-config) for either unicast or multicast (e.g., for codebook construction of multicast received slot/TRP/cell). Here, a UE may configure TDRA of DCI format 1_0 by truncation based on K1 configured of DCI format 1_1/2.

2) For DCI reception with a CRC scrambled by a C-RNTI, a UE may configure TDRA in a conventional manner.

Even for PTP retransmission reception for an MBS TB, a UE may configure TDRA based on C-RNTI DCI.

E. Meanwhile, if only one of a normal uplink (NUL) and a supplemental uplink (SUL) configures a PUCCH configuration (e.g., PUCCH-config) for an MBS, and, if a UE cannot select a PUCCH carrier (i.e., NUL or SUL) configured in a PUCCH configuration (e.g., PUCCH-config) for an MBS based on a threshold, a UE may operate as follows:

Option 1: A UE may select a PUCCH carrier based on a PUCCH configuration (e.g., PUCCH-config) for unicast to transmit an MBS HARQ-ACK.

Option 2: A UE may ignore a threshold and select a carrier (NUL or SUL) configured in a PUCCH configuration (e.g., PUCCH-config) for an MBS.

F. Meanwhile, if a NACK-only based HARQ-ACK is configured for only one of NUL and SUL, and if a UE cannot select a PUCCH carrier (i.e., NUL or SUL) configured in a PUCCH configuration for an MBS (e.g., PUCCH-config) based on a threshold, a UE can operate as follows:

Option 1: A NACK-only based HARQ-ACK may be changed to an ACK/NACK based HARQ-ACK (e.g., may be considered by a UE).

Option 2: A UE may ignore a threshold and select a carrier (NUL or SUL) configured in a PUCCH configuration (e.g., PUCCH-config) for an MBS.

G. On the other hand, when an ACK/NACK based HARQ-ACK is configured and a PUCCH configuration (e.g., PUCCH-config) for multicast is not configured, a UE may determine a PUCCH resource for MBS HARQ-ACK transmission in one or more of the following methods (e.g., a combination of a plurality of methods).

1) Method of allocating a PUCCH resource of a PUCCH configuration (e.g., PUCCH-config) for unicast corresponding to a PRI and K1 of DCI Option 1: If only a PUCCH configuration (e.g., PUCCH-config) for unicast is configured, a UE may ignore a PRI of group common DCI and not transmit an MBS HARQ-ACK.

If a UE receives a PRI of UE specific DCI for PTP PDSCH transmission, a The UE may transmit a HARQ-ACK for a PTP PDSCH by applying a PUCCH configuration for unicast (e.g., PUCCH-config).

Alternatively, even when a UE receives a PRI of UE specific DCI for PTP PDSCH transmission, since it is a HARQ-ACK for multicast, the UE may ignore the corresponding PRI and not transmit a HARQ-ACK for a PTP PDSCH.

Option 2: A UE may transmit an MBS HARQ-ACK by mapping a PRI of DCI to a candidate PUCCH resource ID value (e.g., pucch-ResourceId) of a PUCCH configuration (e.g., PUCCH-config) for unicast.

In this case, a UE may transmit an MBS HARQ-ACK using a PUCCH resource mapped to a candidate PUCCH resource ID value (e.g., pucch-ResourceId) of a PUCCH configuration (e.g., PUCCH-config) indicated by a PRI of DCI as in Option 1' of 2) below Method 1. For example, when Group common DCI indicates a UE specific PRI as in option 1A-1 above, a UE may transmit an MBS HARQ-ACK using a PUCCH resource corresponding to a PRI indicated in a PUCCH configuration (e.g., PUCCH-config) for unicast.

2) Method of allocating a PUCCH resource of a PUCCH configuration (e.g., PUCCH-config) for unicast corresponding to a PRI and K1 of DCI when multiple PUCCHs are simultaneously transmitted Option 1: When a UE receives group common DCI and the DCI includes a PRI and K1 for an MBS, the UE may transmit an MBS HARQ-ACK on a PUCCH resources of a PUCCH configuration (e.g., PUCCH-config) for unicast indicated by a PRI and K1 for the included MBS.

Option 2: When a UE receives UE specific DCI including a PRI/K1 for Rel-15/16 and a PRI/K1 for an MBS at the same time, a UE may transmit an MBS HARQ-ACK with a PUCCH resource of a PUCCH configuration (e.g., PUCCH-config) for unicast indicated by a PRI and K1 for the included MBS. Meanwhile, in a PUCCH resource according to a PRI/K1 for Rel-15/16, a UE may transmit a HARQ-ACK for a unicast PDSCH according to the prior art.

3) Method of allocating a PUCCH resource of a PUCCH configuration (e.g., PUCCH-config) for unicast corresponding to a PRI and K1 of DCI when multiple PUCCHs are not transmitted simultaneously Option 1: When group common DCI received by a UE includes a PRI for an MBS, a UE may ignore a PRI for the included MBS and not transmit an MBS HARQ-ACK.

Option 2: When group common DCI received by a UE includes a UE specific MBS PRI/K1, a UE may transmit an MBS HARQ-ACK in a PUCCH resource of a PUCCH configuration (e.g., PUCCH-config) for unicast indicated by the included UE specific PRI and K1.

Here, when there is UCI for unicast (e.g., unicast HARQ-ACK or SR or CSI), UCI for unicast and an MBS HARQ-ACK may be multiplexed (mux) and transmitted.

Furthermore, only a HARQ-ACK for PTP retransmission may be limitedly multiplexed with unicast UCI and transmitted.

Option 3: When UE specific DCI received by a UE includes only a Rel-15/16 PRI/K1, the UE may transmit an MBS HARQ-ACK with a PUCCH resource of a PUCCH configuration (e.g., PUCCH-config) for unicast indicated by the included PRI and K1.

Here, when there is UCI for unicast (e.g., unicast HARQ-ACK or SR or CSI), UCI for unicast and an MBS HARQ-ACK may be multiplexed (mux) and transmitted.

In addition, only a HARQ-ACK for PTP retransmission may be limitedly multiplexed with unicast UCI and transmitted.

H. Meanwhile, a base station may provide multicast SPS by configuring UE common SPS as follows.

1) In case of a group common SPS PDSCH (not scheduled by DCI but scheduled by RRC), a group common PUCCH resource used for a NACK only based HARQ-ACK may be semi-statically configured for one or more group common SPS configurations. (Alternatively, a UE-specific PUCCH resource for an ACK/NACK based HARQ-ACK may be configured for one or more group common SPS configurations. Alternatively, a group common PUCCH resource for an ACK and a group common PUCCH resource for a NACK may be configured separately for one or more group common SPS configurations.)

a) Different SPS configurations may be configured with the same PUCCH resource or different PUCCH resources.

If the same PUCCH resource is allocated for different SPS PDSCHs of different SPS configurations:

Option 1: One HARQ-ACK bit may indicate an ACK or a NACK for all SPS PDSCHs.

Here, if all SPS PDSCHs are successfully received, a UE may indicate an ACK. Alternatively, if one or more SPS PDSCHs are not successfully received, a UE may indicate a NACK.

Option 2: Different HARQ-ACK bits may indicate an ACK or a NACK for different SPS PDSCHs, respectively.

On the other hand, if different PUCCH resources are allocated for different PDSCHs of different SPS configurations:

Different HARQ-ACK resources may indicate an ACK or a NACK for different SPS PDSCHs, respectively.

b) If a PUCCH resource for SPS configuration index=N is not explicitly configured, a UE may determine that a PUCCH resource for SPS configuration index=N−k (or N+k) is also used for SPS configuration index=N. Here, k=1 or another integer.

c) When PUCCH configuration (e.g., PUCCH-config) for multicast is configured, a PUCCH resource for group common SPS configuration index(s) may be determined based on a PUCCH configuration for multicast (e.g., PUCCH-config) and a PUCCH resource for UE-specific SPS configuration index(s) may be determined based on a PUCCH configuration for unicast (e.g., PUCCH-config).

On the other hand, when a PUCCH configuration (e.g., PUCCH-config) for multicast is not configured, a UE may determine that a PUCCH resource for group common SPS configuration index(s) is determined based on a PUCCH configuration (e.g., PUCCH-config) for unicast.

2) In the case of group common SPS retransmission, a PUCCH resource may be allocated by DCI with a CRC scrambled by a G-CS-RNTI.

a) When a UE determines a PUCCH resource, the UE may regard this group common SPS retransmission as a group common PDSCH scheduled by DCI.

b) When a PUCCH configuration (e.g., PUCCH-config) for multicast is configured, a UE may determine that a PUCCH resource for group common SPS retransmission is determined based on a PUCCH configuration (e.g., PUCCH-config) for multicast.

c) If a PUCCH configuration (e.g., PUCCH-config) for multicast is not configured, a UE may determine that a PUCCH resource for group common SPS retransmission is determined based on a PUCCH configuration for unicast (e.g., PUCCH-config).

When a UE determines a PUCCH resource, a UE may regard this SPS retransmission as a unicast PDSCH (or group common PDSCH).

3) For UE-specific SPS retransmission of a TB initially transmitted by a group common SPS PDSCH, a PUCCH resource may be allocated by DCI scrambled a CRC by a CS-RNTI.

a) When a UE determines a PUCCH resource, the UE may regard this UE-specific SPS retransmission as a unicast PDSCH.

Alternatively, when a UE determines a PUCCH resource, the UE may regard this UE specific SPS retransmission as a group common PDSCH scheduled by DCI.

b) When a PUCCH configuration (e.g., PUCCH-config) for multicast is configured, a UE may determine that a PUCCH resource for group common SPS retransmission is determined based on a PUCCH configuration for multicast (e.g., PUCCH-config).

Alternatively, even if a UE has a PUCCH configuration (e.g., PUCCH-config) for multicast, the UE may determine that a PUCCH resource for group common SPS retransmission is determined based on a PUCCH configuration for unicast (e.g., PUCCH-config).

c) If PUCCH-config for multicast is not configured, UE determines that PUCCH resources for group common SPS retransmission is determined based on PUCCH-config for unicast.

When a PUCCH-config for multicast is not configured, a UE determines that a PUCCH resource for group common SPS retransmission is determined based on PUCCH-config for unicast.

4) Either a NACK only based HARQ-ACK or a UE specific ACK/NACK based HARQ-ACK may be used for SPS PDSCH retransmission.

I. When transmitting Unicast UCI and one or a plurality of MBS HARQ-ACK(s) together in the same slot or sub-slot according to these processes/methods, a UE may transmit one or more PUCCHs as follows.

When multiple unicast HARQ-ACK(s) of HP for unicast PDSCH(s), X multicast HARQ-ACK(s) of HP for multicast PDSCH(s), and Y multicast HARQ-ACK(s) of LP for multicast PDSCH(s) overlap in the same slot, a UE may transmit PUCCH(s) as follows:

1) Option 1: A UE supporting 2 TDMed PUCCHs may transmit 2 TDMed PUCCHs in the slot (e.g., when a PUCCH configuration for multicast (e.g., PUCCH-Config) and a PUCCH configuration for unicast (e.g., PUCCH-Config) are separately configured).

a) Option 1-1: A UE may transmit one PUCCH (some of multicast HARQ-ACKs may be dropped or may not dropped) carrying a separate HARQ-ACK codebook for multiplexed multicast HARQ-ACK(s) and one PUCCH carrying a separate HARQ-ACK codebook for unicast HARQ-ACK(s).

b) Option 1-2: A UE may transmit one PUCCH (some of multicast HARQ-ACKs may be dropped or may not dropped) for multiplexed multicast HARQ-ACK(s) and transmit one PUCCH for multiplexed multicast HARQ-ACK(s) and unicast HARQ-ACK(s).

c) In option 1, A UE may transmit as follows:

c-1) A UE may transmit different PUCCHs configured for different cells. For example, a UE may transmit i) one PUCCH for PCell and ii) one PUCCH for SCell having multicast reception.

c-2) A UE may transmit different PUCCHs configured for different priorities. For example, a UE may transmit i) one PUCCH for multiplexing HARQ-ACKs with HP and ii) one PUCCH for multiplexing HARQ-ACKs with LP.

c-3) A UE may transmit configured PUCCHs for a HARQ-ACK and CSI/SR. For example, a UE may transmit i) one PUCCH for multiplexing multicast/unicast HARQ-ACKs, and ii) one PUCCH for multiplexing CSI reporting and SR.

c-4) A UE may transmit PUCCHs for different cast types. For example, a UE may transmit i) one PUCCH for unicast HARQ-ACKs and ii) one PUCCH for multicast HARQ-ACKs.

c-5) A UE may transmit different PUCCHs based on a UE capability or a maximum PUCCH payload size. A UE may transmit i) one PUCCH for multiplexing Z multicast HARQ-ACKs and unicast HARQ-ACKs, and ii) one PUCCH for multiplexing (X+Y−Z) multicast HARQ-ACKs.

Here, Z may be determined based on a UE capability or a maximum PUCCH payload size. Z multicast HARQ-ACKs may be determined among X multicast HPs and Y multicast LPs based on one or more of the following:

HP may be included in Z multicast HARQ-ACKs in preference to LP.

An earlier PDSCH occasion may be included in Z multicast HARQ-ACKs with priority.

c-6) A UE may transmit different PUCCHs configured for a non-MBS and an MBS. For example, a UE may transmit i) one PUCCH (i.e., a first PUCCH) for multiplexing unicast HARQ-ACK, CSI reporting, and SR, ii) one PUCCH (i.e., the second PUCCH) for multiplexing of multicast HARQ-ACK (and, if configured, multicast CSI reports).

For example, in the case of a UE supporting two TDMed PUCCHs for unicast and multicast, two PUCCHs can be transmitted in the same slot. In this case, REL-15/16 feedback (HARQ-ACK, CSI and/or SR) may be multiplexed on a first PUCCH based on a PUCCH configuration (e.g., PUCCH-config) for unicast excluding multicast HARQ-ACK(s). In a second PUCCH, multiple HARQ-ACK(s) may be multiplexed.

Here, if a first PUCCH and a second PUCCH overlap, they may be multiplexed into one PUCCH according to the REL-15/16 rule. On the other hand, if a first PUCCH and a second PUCCH do not overlap, they may be transmitted separately.

In addition, when a PUCCH configuration (e.g., PUCCH-config) for multicast is configured, a second PUCCH may be determined based on a PUCCH configuration (e.g., PUCCH-config) for multicast. On the other hand, if a PUCCH configuration for multicast (e.g., PUCCH-config) is not configured, a second PUCCH for multicast HARQ-ACK may be determined based on a PUCCH configuration for unicast (e.g., PUCCH-config).

2) Option 2: A UE that does not support two PUCCHs may transmit only one of the following PUCCHs (e.g., when a PUCCH configuration (e.g., PUCCH-Config) for multicast are not separately configured) and drop the remaining PUCCHs.

a) A UE may transmit one of PUCCHs configured for different cells. For example, a UE may transmit one of i) one PUCCH for PCell and ii) one PUCCH for multicast-received SCell.

b) A UE may transmit one of PUCCHs configured for different priorities. For example, a UE may transmit one of i) a PUCCH for multiplexing HARQ-ACK(s) with HP, ii) a PUCCH for multiplexing HARQ-ACK(s) with LP.

c) A UE may transmit one of PUCCH(s) configured for HARQ-ACK(s) and CSI/SR. For example, a UE may transmit one of i) a PUCCH for multiplexing multicast/unicast HARQ-ACK(s), and ii) a PUCCH for multiplexing CSI reporting and SR.

d) A UE may transmit one of PUCCHs configured for different cast types. For example, a UE may transmit one of i) a PUCCH for unicast HARQ-ACK(s) and ii) a PUCCH for multicast HARQ-ACK(s).

e) A UE may transmit one of PUCCHs based on a UE capability or a maximum PUCCH payload size. A UE may transmit one of i) one PUCCH for multiplexing Z multicast HARQ-ACK(s) and unicast HARQ-ACK(s), ii) one PUCCH for multiplexing (X+Y−Z) multicast HARQ-ACK(s).

Here, Z may be determined based on a UE capability or a maximum PUCCH payload size. Z multicast HARQ-ACK(s) may be determined among X multicast HP HARQ-ACK(s) and Y multicast LP HARQ-ACK(s) based on one or more of the following:

HP may be included in Z multicast HARQ-ACK(s) in preference to LP.

An earlier PDSCH occasion may be included in Z multicast HARQ-ACK(s) with priority.

f) A UE may transmit one of PUCCHs configured for a non-MBS and an MBS. For example, a UE may transmit i) one PUCCH (i.e., the first PUCCH) for multiplexing of unicast HARQ-ACK(s), CSI reporting and SR and ii) one PUCCH (i.e., the second PUCCH) for multiplexing of multicast HARQ-ACK (and, if configured, multicast CSI reports).

For example, in the case of a UE supporting two TDMed PUCCHs for unicast and multicast, two PUCCHs may be transmitted in the same slot. In this case, REL-15/16 feedback (HARQ-ACK, CSI and/or SR) may be multiplexed on a first PUCCH based on a PUCCH configuration (e.g., PUCCH-config) for unicast excluding multicast HARQ-ACK(s). In a second PUCCH, multiple HARQ-ACK(s) may be multiplexed.

Here, if a first PUCCH and a second PUCCH overlap, they may be multiplexed into one PUCCH according to the REL-15/16 rule. On the other hand, if a first PUCCH and a second PUCCH do not overlap, they may be transmitted separately.

In addition, when a PUCCH configuration for multicast (e.g., PUCCH-config) is configured, a second PUCCH may be determined based on a PUCCH configuration for multicast (e.g., PUCCH-config). On the other hand, if a PUCCH configuration for multicast (e.g., PUCCH-config) is not configured, a second PUCCH for multicast HARQ-ACK may be determined based on a PUCCH configuration for unicast (e.g., PUCCH-config).

3) Option 3: A UE may drop all or part of multicast HARQ-ACK(s) with LP according to a UE capability or a maximum PUCCH payload size.

A UE may transmit one PUCCH by multiplexing Z multicast HARQ-ACK(s) and unicast HARQ-ACK(s).

Here, Z may be determined based on a UE capability or a maximum PUCCH payload size. Z multicast HARQ-ACK(s) may be determined among X multicast HP HARQ-ACK(s) and Y multicast LP HARQ-ACK(s) based on one or more of the following:

HP may be included in Z multicast HARQ-ACK(s) in preference to LP.

An earlier PDSCH occasion may be included in Z multicast HARQ-ACK(s) with priority.

4) Option 4: A UE may defer all or part of multicast HARQ-ACK(s) to the next PUCCH transmission (e.g., depending on whether a PUCCH configuration for multicast (e.g., PUCCH-Config) and a PUCCH configuration for unicast (e.g., PUCCH-Config) are separately configured) and transmit unicast/multicast remaining HARQ-ACK(s) on a PUCCH in the current slot:

a) This option is applicable only when semi-static PUCCH resources are periodically configured.

b) Option 4-1: Z multicast HARQ-ACK(s) may be deferred to the next PUCCH transmission allocated to unicast or other multicast PDSCH. Deferred multicast HARQ-ACK(s) may be multiplexed with next unicast HARQ-ACK(s) and/or other multicast HARQ-ACK(s).

The next unicast HARQ-ACK(s) in the next PUCCH may not be HP.

Other multicast HARQ-ACK(s) in the next PUCCH may not be HP.

Deferred multicast HARQ-ACK(s) may be deferred until a maximum K value or the next PUCCH resource.

c) Option 4-2: Z multicast HARQ-ACK(s) may be deferred to the next PUCCH transmission allocated to another multicast PDSCH (not unicast PDSCH) (e.g., when a PUCCH configuration (e.g., PUCCH-Config) for multicast is separately configured).

Other multicast HARQ-ACK(s) in the next PUCCH may not be HP.

Deferred multicast HARQ-ACK(s) may be deferred until a maximum K value or the next PUCCH resource.

d) In option 4, when only some of multicast HARQ-ACK(s) are delayed,

Non-deferred multicast HARQ-ACK(s) may be dropped or multiplexed like option 1 or 2.

Non-deferred multicast HARQ-ACK(s) may be bundled like option 5.

e) In option 4, a UE may determine Z multicast HARQ-ACK(s) among X multicast HARQ-ACK(s) with HP and Y multicast HARQ-ACK(s) with LP.

HP may prioritize over LP (or only HP may be deferred). Alternatively, LP may prioritize over HP (or only LP may be deferred).

An earlier PDSCH occasion may prioritize. Alternatively, a later PDSCH occasion may prioritize.

f) If a PUCCH configuration (e.g., PUCCH-Config) for multicast is not separately configured, a UE cannot defer all or part of multicast HARQ-ACK(s) and may drop them.

5) Option 5: A UE may bundle multicast HARQ-ACK(s) and unicast HARQ-ACK(s).

a) For example, 1 HARQ-ACK bit on a PUCCH may indicate bundling of multicast HARQ-ACK(s) and unicast HARQ-ACK(s).

Here, when both multicast HARQ-ACK(s) and unicast HARQ-ACK(s) in a bundle correspond to an ACK, a HARQ-ACK bit may indicate an ACK. On the other hand, if at least one of multicast HARQ-ACK(s) and unicast HARQ-ACK(s) in a bundle corresponds to a NACK, a HARQ-ACK bit may indicate an ACK.

b) If only some of multicast HARQ-ACK(s) are bundled (e.g., with the same priority):

Non-bundled multicast HARQ-ACK(s) may be multiplexed like option 1 or 2.

Alternatively, non-bundled multicast HARQ-ACK(s) may be dropped as in option 3.

Alternatively, non-bundled multicast HARQ-ACK(s) may be deferred like option 4.

c) Option 5-1: Z multicast HARQ-ACK(s) may be bundled with K HARQ-ACK bits (K<Z)(s).

Here, a UE may transmit one HARQ-ACK codebook through a PUCCH.

Alternatively, a UE may transmit a separate sub-codebook for bundling HARQ-ACK(s) and a separate sub-codebook for the remaining HARQ-ACK(s) on one PUCCH.

Alternatively, a UE may transmit a separate codebook for bundling HARQ-ACK(s) and a separate codebook for the remaining HARQ-ACK(s) on two PUCCHs, respectively.

d) Option 5-2: Z multicast HARQ-ACK(s) and unicast HARQ-ACK(s) may be bundled into K HARQ-ACK bit(s) (e.g., when a PUCCH configuration (e.g., PUCCH-Config) for multicast is not separately configured).

Here, a UE may transmit one HARQ-ACK codebook through a PUCCH.

Alternatively, a UE may transmit a separate sub-codebook for bundling HARQ-ACK(s) and a separate sub-codebook for the remaining HARQ-ACKs on one PUCCH.

Alternatively, a UE may transmit a separate codebook for bundling HARQ-ACK(s) and a separate codebook for the remaining HARQ-ACK(s) on two PUCCHs, respectively.

e) If only some of multicast HARQ-ACK(s) are bundled in option 5 (e.g., with the same priority):

Non-bundled multicast HARQ-ACK(s) may be dropped or multiplexed as in option 1 or 2.

Alternatively, non-bundled multicast HARQ-ACK(s) may be deferred as in option 4.

J. Meanwhile, for two PUCCH transmissions of each of multicast HARQ-ACK(s) and unicast HARQ-ACK(s) or for multiplexing of multicast HARQ-ACK(s) and unicast HARQ-ACK(s) on one PUCCH, if a PUCCH of N symbol slots is determined for unicast HARQ-ACK(s), it needs to be determined for a PUCCH multicast HARQ-ACK(s) of N symbol slots. If a PUCCH of N symbol slots cannot be determined for multicast HARQ-ACK(s) (e.g., when a PUCCH of N symbol slots is not configured in a PUCCH configuration for multicast (e.g., PUCCH-config)), multicast HARQ-ACK (s) may be dropped or deferred. Alternatively, when a PUCCH of N symbol slots cannot be determined for multicast HARQ-ACK(s) based on a PUCCH configuration (e.g., PUCCH-config) for multicast, a PUCCH of N symbol slots may be determined for multicast HARQ-ACK(s) based on a PUCCH configuration for unicast (e.g., PUCCH-config).

For example, for multiplexing (mux) with the same priority, a PUCCH may be configured so that if unicast corresponds to a subslot, multicast also corresponds to a subslot, and if unicast corresponds to a slot, multicast also corresponds to a slot. Alternatively, if a mini-slot is supported, a PUCCH may be configured so that if unicast corresponds to 2 symbols, multicast also corresponds to 2 symbol subslot, and if unicast corresponds to 7 symbols, multicast also corresponds to 7 symbol subs lot.

8. If decoding of a TB on a PDSCH transmission occasion fails, a UE may transmit a HARQ NACK to a base station on a PUCCH resources in a configured UL CFR (S906b).

By using a PUCCH resource, a UE may also transmit a HARQ-ACK for other PDSCH transmissions such as a unicast SPS PDSCH, a dynamic unicast PDSCH, PTP retransmission, and/or a dynamic group common PDSCH. In this case, to multiplex a HARQ-ACK on a PUCCH in a (sub)slot for an SPS PDSCH for multicast, an SPS PDSCH for unicast, a dynamically scheduled multicast PDSCH, and/or a dynamically scheduled unicast PDSCH, a UE may construct a codebook based on one or more options in step 7 above.

Meanwhile, if a PDSCH aggregation factor (pdsch-AggregationFactor) is configured for a G-RNTI or a base station indicates a repetition number (repeat number) in DCI, a TB scheduled by group common DCI may be repeated for the Nth HARQ transmission of a TB within each symbol allocation among each PDSCH aggregation factor (pdsch-AggregationFactor) consecutive slots or among each repetition number (repeat number) consecutive slots.

In the case of a HARQ ACK for slot-based group common PDSCH repetition of a TB, if a PDSCH aggregation factor (pdsch-AggregationFactor) is configured for a G-RNTI or a base station indicates a repetition number (repeat number) in DCI with a CRC scrambled by a G-RNTI, a base station may allocate multiple PUCCH resources as follows:

Option 1: Multiple PUCCH resources may be allocated by group common DCI scheduling slot-based group common PDSCH repetition.

Option 2: A periodic PUCCH resource may be allocated to a UE receiving a G-RNTI.

Option 3: A periodic PUCCH may be allocated for G-RNTI(s) or a CFR for which group common PDSCH repetition is scheduled.

Here, when an ACK/NACK-based HARQ-ACK is configured, different UEs may select different PUCCH resources.

If a UE successfully receives a TB from HARQ process number (HPN) #i before slot-based group common PDSCH repetition ends, and if a PUCCH resource for a HARQ-ACK for a TB is available before slot-based group common PDSCH repetition ends, a UE may transmit an ACK for a PUCCH resource before the slot-based group common PDSCH repetition ends.

Option A: A UE may skip ACK transmission in another PUCCH resource after slot-based group common PDSCH repetition ends. In this option, a UE can receive another TB from HPN #i.

Option B: A UE may retransmit an ACK in another PUCCH resource after completion of slot-based group common PDSCH repetition.

Option C: A UE may deprioritize ACK transmission in other PUCCH resources after the slot-based group common PDSCH repetition ends.

Additionally, a UE may transmit an ACK in a UE-specific PUCCH resource allocated for a unicast PDSCH.

Alternatively, a UE may not transmit an ACK in a PUCCH resource before the slot-based group common PDSCH repetition ends. In this case, a UE may transmit a HARQ-ACK through a PUCCH resource indicated by a PRI of DCI scheduling a group common PDSCH after slot-based group common PDSCH repetition ends.

If a UE successfully receives a TB (e.g., in the Nth HARQ transmission), and if a UE monitors HARQ retransmission (e.g., N+K th HARQ transmission) of a TB by UE-specific DCI or group common DCI, a UE may perform one of the following.

Option A: A UE may skip ACK transmission in a PUCCH resource allocated by DCI.

Option B: A UE may retransmit an ACK in a PUCCH resource allocated by DCI.

Option C: A UE may deprioritize ACK transmission in a PUCCH resource allocated by DCI.

9. A base station receiving a HARQ NACK with a TCI state may retransmit a PDCCH and a PDSCH with a TCI state in a DL CFR configured for TB retransmission. A UE may monitor a group common and/or UE-specific PDCCH with a TCI state on a search space configured in a DL CFR to receive TB retransmission (S907b).

A base station may retransmit a TB to only one of UEs in a group by a UE-specific PDCCH, and other UEs may not receive retransmission of a TB (e.g., because the other UEs successfully received the TB).

10. When a UE receives a PDCCH for retransmission of a TB (S908b), a UE may receive a PDSCH scheduled by DCI of a PDCCH (S909b, S910b).

If a UE successfully decodes a TB on a PDSCH, based on a mapping between an MBS service indicated by DCI and an HPN (HARQ process number) and/or between an MBS service indicated by DCI and a short ID(s) (if available), the UE may consider that the decoded TB is associated with an MTCH, an MRB, a TMGI, a G-RNTI and/or a short ID of an MBS service.

11. If decoding of a TB succeeds in a PDSCH transmission occasion, a UE may transmit a HARQ ACK to a base station through a PUCCH resource in a UL CFR configured according to step 7. On the other hand, if decoding of a TB on a PDSCH transmission occasion fails, a UE may transmit a HARQ NACK to a base station on a PUCCH resource in a configured UL CFR (S911b).

By using a PUCCH resource, a UE may also transmit HARQ-ACKs for other PDSCH transmissions such as a unicast SPS PDSCH, a dynamic unicast PDSCH, PTP retransmission, and/or a dynamic group common PDSCH. In this case, to multiplex HARQ-ACKs on a PUCCH in a (sub)slot for an SPS PDSCH for multicast, an SPS PDSCH for unicast, a dynamically scheduled multicast PDSCH, and/or a dynamically scheduled unicast PDSCH, a UE may construct a codebook based on one or more options in step 7 above.

12. Meanwhile, upon collision, a UE may monitor a multicast PDCCH and receive a multicast PDSCH as follows:

A. If a multicast PUCCH overlaps semi-statically configured unicast DL reception, or If a multicast PUCCH overlaps semi-statically configured unicast UL transmission, or If a multicast PUCCH overlaps with a semi-statically configured sidelink, In the case of an MBS SPS HARQ-ACK, a UE may defer or drop a HARQ-ACK.

In the case of an MBS HARQ ACK indicated by a PRI of DCI, a UE may transmit a HARQ-ACK.

B. If a multicast PUCCH overlaps with dynamically configured unicast DL reception, or If a multicast PUCCH overlaps with dynamically configured unicast UL transmission, A UE may defer or drop a HARQ-ACK (e.g., when a HARQ-ACK is LP or other TX/RX is HP).

A UE may transmit a HARQ-ACK (e.g., when a HARQ-ACK is HP and other TX/RX is LP).

C. If a multicast PUCCH overlaps with a dynamic multicast PDSCH,

A UE may drop a HARQ-ACK up to a maximum value of K1 (when multicast is HP).

D. If a multicast PUCCH overlaps with a multicast SPS PDSCH, a UE may defer or drop a HARQ-ACK.

E. When a UE triggers a RACH, a UE may monitor a group common PDCCH and receive a group common PDSCH as follows.

A UE may monitor a group common PDCCH after triggering a RACH.

When a RACH is triggered, a UE may suspend monitoring of a group common PDCCH and reception of a group common PDSCH.

A UE may resume group common PDCCH reception after one of MSG1, MSG2, MSG3, and MSG4 of step 4 RACH or one of MSGA and MSGA of step 2 RACH.

In the case of step 4 RACH, a UE may prioritize MSG1, MSG2, MSG3, and MSG4 over group common PDCCH/PDSCH reception, a group common PDSCH, and a HARQ-ACK.

In the case of step 2 RACH, MSGA and MSGB may be prioritized over group common PDCCH/PDSCH reception, a group common PDSCH and a HARQ-ACK.

A UE may transmit an MBS HARQ-ACK through a PUCCH immediately after MSG2/B reception (for CF-RACH) or first MSG3 transmission (for CB-RACH).

A UE cannot transmit an MBS HARQ-ACK without UL synchronization.

MSG3 may not be multiplexed with a PUCCH A/N.

A UE may disable a HARQ-ACK before MSG3 (or MSG2/B) and enable a HARQ-ACK after MSG3 (or MSG2/B).

Meanwhile, an example of FIG. 9 is for convenience of description and does not limit the scope of the present disclosure. Some step(s) illustrated in FIG. 9 may be omitted depending on circumstances and/or settings. In addition, a base station and a UE in FIG. 9 are just one example, and may be implemented as the device illustrated in FIG. 12 below. For example, the processor (102/202) of FIG. 12 can control to transmit and receive channels/signals/data/information, etc. using the transceiver (106/206) and can also control to store transmitted or received channels/signals/information/data/information, etc. in the memory (104/204).

A base station may be a general term for an object that transmits and receives data with a terminal. For example, a base station may be a concept including one or more transmission points (TPs), one or more transmission and reception points (TRPs), etc. Also, a TP and/or a TRP may include a panel of a base station, a transmission and reception unit, etc. In addition, "TRP" may be replaced with expressions such as a panel, an antenna array, a cell (e.g., macro cell/small cell/pico cell, etc.)/a TP (transmission point), base station (base station, gNB, etc.), etc. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 9, signaling between one base station and a UE is considered for convenience of explanation, but the corresponding signaling scheme can be extended and applied to signaling between multiple TRPs and multiple UEs. Alternatively, a base station may include a plurality of TRPs, or may be one cell including a plurality of TRPs.

Figure 10:
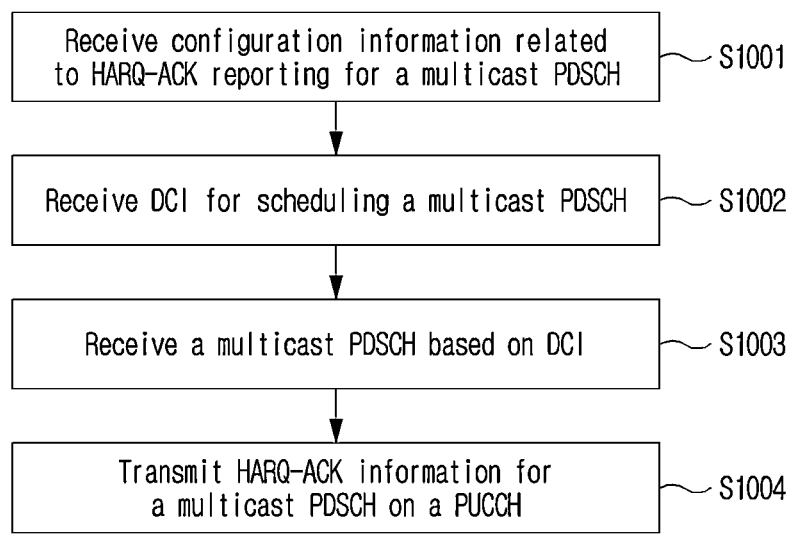
FIG. 10 is a diagram illustrating an operation of a UE for a method for transmitting and receiving HARQ-ACK information according to an embodiment of the present disclosure.

FIG. 10 is a diagram illustrating an operation of a UE for a method for transmitting and receiving HARQ-ACK information according to an embodiment of the present disclosure.

In FIG. 10, an operation of a UE based on any one or a combination of the methods proposed above and one or more (detailed) methods is illustrated. An example of FIG. 10 is for convenience of description and does not limit the scope of the present disclosure. Some step(s) illustrated in FIG. 10 may be omitted depending on circumstances and/or settings. In addition, a UE in FIG. 10 is just one example, and may be implemented as the device illustrated in FIG. 12 below. For example, the processor (102/202) of FIG. 12 can control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver (106/206) and can also control to store transmitted or received channels/signals/information/data/information, etc. in the memory (104/204).

A UE receives configuration information related to HARQ-ACK reporting for a multicast PDSCH from a base station (S1001).

Here, the configuration information may configure one reporting method (mode) of ACK/NACK based HARQ-ACK reporting or NACK-only based HARQ-ACK reporting for each of one or more identifiers configured for a UE. In other words, for all of one or more identifiers configured for a UE, for each identifier, one reporting method (mode) of ACK/NACK based HARQ-ACK reporting or NACK-only based HARQ-ACK reporting may be configured.

The UE may be configured with one or more identifiers (i.e., RNTI), and these one or more identifiers may include one or more G-RNTIs and/or one or more G-CS-RNTIs and/or one or more C-RNTIs and/or one or more CS-RNTIs, etc.

Meanwhile, although not shown in FIG. 10, a UE may further receive common frequency resource (CFR) configuration information, one or more group common PDSCH (or multicast PDSCH) configuration information (separate from unicast PDSCH), PUCCH configuration information for a group common PDSCH (or a multicast PDSCH) (separate from PUCCH configuration for a unicast PDSCH), one or more search space configuration information from a base station.

Here, one or more group common PDSCH (or multicast PDSCH) configuration information may be configured independently for each CFR or may be configured independently for each uplink BWP associated with a CFR.

The above configuration information may be transmitted through a higher layer message (e.g., an RRC message), and this higher layer message may be a group common message or a UE-specific message.

A UE receives DCI (e.g., multicast DCI) for scheduling a multicast PDSCH from a base station (S1002).

Here, DCI for scheduling a multicast PDSCH may mean DCI with a CRC scrambled by a specific identifier among one or more identifiers configured for a UE. That is, it may mean DCI with a CRC scrambled by one G-RNTI (or one G-CS-RNTI) among one or more G-RNTIs and/or one or more G-CS-RNTIs configured for a UE.

For example, in the case of DCI with a CRC scrambled with a G-RNTI, frequency/time domain resource allocation for a multicast PDSCH, a PUCCH resource indicator (PRI), a PDSCH-to-HARQ_feedback timing indicator (PDSCH-to-HARQ_feedback timing indicator), and a priority indicator, etc. may be included. For example, in the case of DCI with a CRC scrambled with a G-CS-RNTI, activation/retransmission/deactivation of an SPS PDSCH may be indicated.

A UE receives a multicast PDSCH based on DCI (e.g., multicast DCI) from a base station (S1003).

As described above, a multicast PDSCH may correspond to a group common PDSCH in the case of a PTM method and may correspond to a UE-specific PDSCH in the case of a PTP method.

For example, in the case of DCI with a CRC scrambled by a G-RNTI, a UE may receive a multicast PDSCH (a group common PDSCH or a UE-specific PDSCH) based on information indicated by DCI. Alternatively, in the case of DCI with a CRC scrambled by a G-CS-RNTI, a UE can receive a multicast PDSCH (i.e., a group common SPS PDSCH) based on SPS PDSCH configuration information configured by higher layer signaling.

A UE transmits HARQ-ACK information for a multicast PDSCH on a PUCCH (referred to as a first PUCCH) to a base station (S1004).

If an ACK/NACK based HARQ-ACK reporting method (mode) is configured for a G-RNTI or a G-CS-RNTI for DCI scheduling the multicast PDSCH, a UE may transmit HARQ-ACK information including an ACK (in case of success) or a NACK (in case of failure) according to whether decoding of a TB carried in the multicast PDSCH is successful through a first PUCCH.

On the other hand, if a NACK-only based HARQ-ACK reporting method (mode) is configured for a G-RNTI or a G-CS-RNTI for DCI scheduling the multicast PDSCH, a UE may not transmit HARQ-ACK information including only an ACK through a first PUCCH. A UE may transmit only HARQ-ACK information including at least NACK other than an ACK or including only a NACK through a first PUCCH.

Here, a resource of a first PUCCH may be indicated (determined) by a PRI field value of DCI among a PUCCH resource set configured by PUCCH configuration information for a multicast PDSCH.

In addition, when PUCCH configuration information for a multicast PDSCH is configured for a CFR or for an uplink BWP, a resource of the first PUCCH is configured in the CFR in the uplink BWP based on the PUCCH configuration information for the multicast PDSCH.

In addition, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, a UE may bundle the first HARQ-ACKs and the second HARQ-ACKs and transmit them through a single PUCCH. In this case, indication information indicating that the first HARQ-ACKs and the second HARQ-ACKs are bundled may be additionally transmitted through a PUCCH.

Alternatively, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, some of both the first HARQ-ACKs and the second HARQ-ACKs may be transmitted through the first PUCCH, and the rest may be transmitted through a second PUCCH (conversely, the PUCCHs may be interchanged). For example, HARQ-ACKs for PCell and HARQ-ACKs for SCell may be separated and transmitted through different PUCCHs. Alternatively, HARQ-ACKs may be classified according to high/low priorities and transmitted through different PUCCHs. Alternatively, HARQ-ACKs may be classified according to a cast type (multicast or unicast) and transmitted through different PUCCHs. Alternatively, based on a capability of the UE or a maximum PUCCH payload size, Z (Z is a natural number) HARQ-ACKs may be transmitted through one PUCCH, and the remaining HARQ-ACKs may be transmitted through another PUCCH.

In addition, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, if a UE can transmit only a single PUCCH, the UE may drop or defer some HARQ-ACKs.

Figure 11:
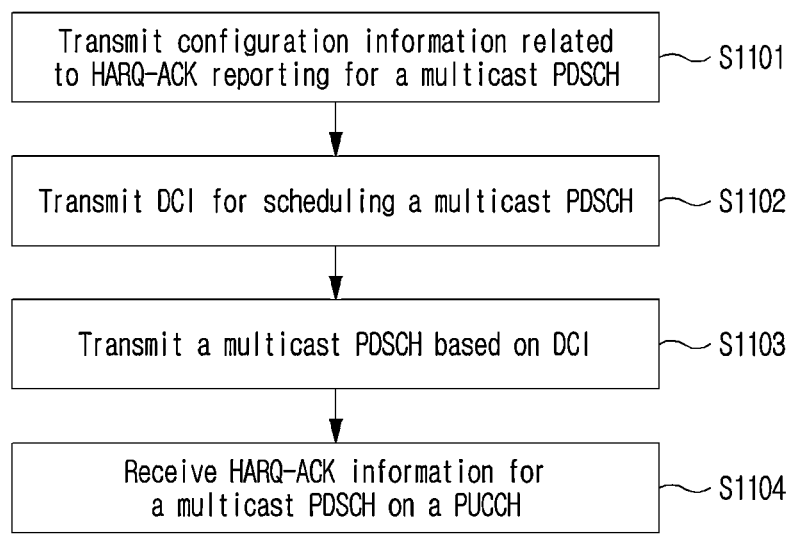
FIG. 11 is a diagram illustrating an operation of a base station for a method for transmitting and receiving HARQ-ACK information according to an embodiment of the present disclosure.

FIG. 11 is a diagram illustrating an operation of a base station for a method for transmitting and receiving HARQ-ACK information according to an embodiment of the present disclosure.

In FIG. 11, an operation of a base station based on any one or a combination of the methods proposed above and one or more (detailed) methods is illustrated. An example of FIG. 11 is for convenience of description and does not limit the scope of the present disclosure. Some step(s) illustrated in FIG. 11 may be omitted depending on circumstances and/or settings. In addition, a base station in FIG. 11 is just one example, and may be implemented as the device illustrated in FIG. 12 below. For example, the processor (102/202) of FIG. 12 can control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver (106/206) and can also control to store transmitted or received channels/signals/information/data/information, etc. in the memory (104/204).

A base station transmits configuration information related to HARQ-ACK reporting for a multicast PDSCH to a UE (S1101).

Here, the configuration information may configure one reporting method (mode) of ACK/NACK based HARQ-ACK reporting or NACK-only based HARQ-ACK reporting for each of one or more identifiers configured for a UE. In other words, for all of one or more identifiers configured for a UE, for each identifier, one reporting method (mode) of ACK/NACK based HARQ-ACK reporting or NACK-only based HARQ-ACK reporting may be configured.

The UE may be configured with one or more identifiers (i.e., RNTI), and these one or more identifiers may include one or more G-RNTIs and/or one or more G-CS-RNTIs and/or one or more C-RNTIs and/or one or more CS-RNTIs, etc.

Meanwhile, although not shown in FIG. 11, a base station may further transmit common frequency resource (CFR) configuration information, one or more group common PDSCH (or multicast PDSCH) configuration information (separate from unicast PDSCH), PUCCH configuration information for a group common PDSCH (or a multicast PDSCH) (separate from PUCCH configuration for a unicast PDSCH), one or more search space configuration information to a UE.

Here, one or more group common PDSCH (or multicast PDSCH) configuration information may be configured independently for each CFR or may be configured independently for each uplink BWP associated with a CFR.

The above configuration information may be transmitted through a higher layer message (e.g., an RRC message), and this higher layer message may be a group common message or a UE-specific message.

A base station transmits DCI (e.g., multicast DCI) for scheduling a multicast PDSCH to a UE (S1102).

Here, DCI for scheduling a multicast PDSCH may mean DCI with a CRC scrambled by a specific identifier among one or more identifiers configured for a UE. That is, it may mean DCI with a CRC scrambled by one G-RNTI (or one G-CS-RNTI) among one or more G-RNTIs and/or one or more G-CS-RNTIs configured for a UE.

For example, in the case of DCI with a CRC scrambled with a G-RNTI, frequency/time domain resource allocation for a multicast PDSCH, a PUCCH resource indicator (PRI), a PDSCH-to-HARQ_feedback timing indicator (PDSCH-to-HARQ_feedback timing indicator), and a priority indicator, etc. may be included. For example, in the case of DCI with a CRC scrambled with a G-CS-RNTI, activation/retransmission/deactivation of an SPS PDSCH may be indicated.

A base station transmits a multicast PDSCH to a UE based on DCI (e.g., multicast DCI) (S1103).

As described above, a multicast PDSCH may correspond to a group common PDSCH in the case of a PTM method and may correspond to a UE-specific PDSCH in the case of a PTP method.

For example, in the case of DCI with a CRC scrambled by a G-RNTI, a base station may transmit a multicast PDSCH (a group common PDSCH or a UE-specific PDSCH) based on information indicated by DCI. Alternatively, in the case of DCI with a CRC scrambled by a G-CS-RNTI, a base station can transmit a multicast PDSCH (i.e., a group common SPS PDSCH) based on SPS PDSCH configuration information configured by higher layer signaling.

A base station receives HARQ-ACK information for a multicast PDSCH on a PUCCH (referred to as a first PUCCH) from a UE (S1104).

If an ACK/NACK based HARQ-ACK reporting method (mode) is configured for a G-RNTI or a G-CS-RNTI for DCI scheduling the multicast PDSCH, a UE may transmit HARQ-ACK information including an ACK (in case of success) or a NACK (in case of failure) according to whether decoding of a TB carried in the multicast PDSCH is successful through a first PUCCH and a base station can determine whether or not to decode a TB according to the received information.

On the other hand, if a NACK-only based HARQ-ACK reporting method (mode) is configured for a G-RNTI or a G-CS-RNTI for DCI scheduling the multicast PDSCH, a UE may not transmit HARQ-ACK information including only an ACK through a first PUCCH. That is, if a base station does not receive HARQ-ACK information through a first PUCCH, it may consider/determine that a UE has successfully decoded a corresponding TB. On the other hand, a UE may transmit only HARQ-ACK information including at least NACK other than an ACK or including only a NACK through a first PUCCH, and a base station can determine whether or not to decode a TB according to the received information.

Here, a resource of a first PUCCH may be indicated (determined) by a PRI field value of DCI among a PUCCH resource set configured by PUCCH configuration information for a multicast PDSCH.

In addition, when PUCCH configuration information for a multicast PDSCH is configured for a CFR or for an uplink BWP, a resource of the first PUCCH is configured in the CFR in the uplink BWP based on the PUCCH configuration information for the multicast PDSCH.

In addition, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, a base station may receive a bundle of the first HARQ-ACKs and the second HARQ-ACKs through a single PUCCH. In this case, indication information indicating that the first HARQ-ACKs and the second HARQ-ACKs are bundled may be additionally transmitted through a PUCCH.

Alternatively, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, some of both the first HARQ-ACKs and the second HARQ-ACKs may be transmitted through the first PUCCH, and the rest may be transmitted through a second PUCCH (conversely, the PUCCHs may be interchanged). For example, HARQ-ACKs for PCell and HARQ-ACKs for SCell may be separated and transmitted through different PUCCHs. Alternatively, HARQ-ACKs may be classified according to high/low priorities and transmitted through different PUCCHs. Alternatively, HARQ-ACKs may be classified according to a cast type (multicast or unicast) and transmitted through different PUCCHs. Alternatively, based on a capability of the UE or a maximum PUCCH payload size, Z (Z is a natural number) HARQ-ACKs may be transmitted through one PUCCH, and the remaining HARQ-ACKs may be transmitted through another PUCCH.

In addition, when a transmission timing of a plurality of first HARQ-ACKs for a multicast PDSCH (including HARQ-ACK in the multicast PDSCH) and a transmission timing of a plurality of second HARQ-ACKs for a unicast PDSCH overlap within the same slot, if a UE can transmit only a single PUCCH, the UE may drop or defer some HARQ-ACKs, and a base station can determine whether or not to decode a TB according to the received information.

General Device to which the Present Disclosure May be Applied

Figure 12:
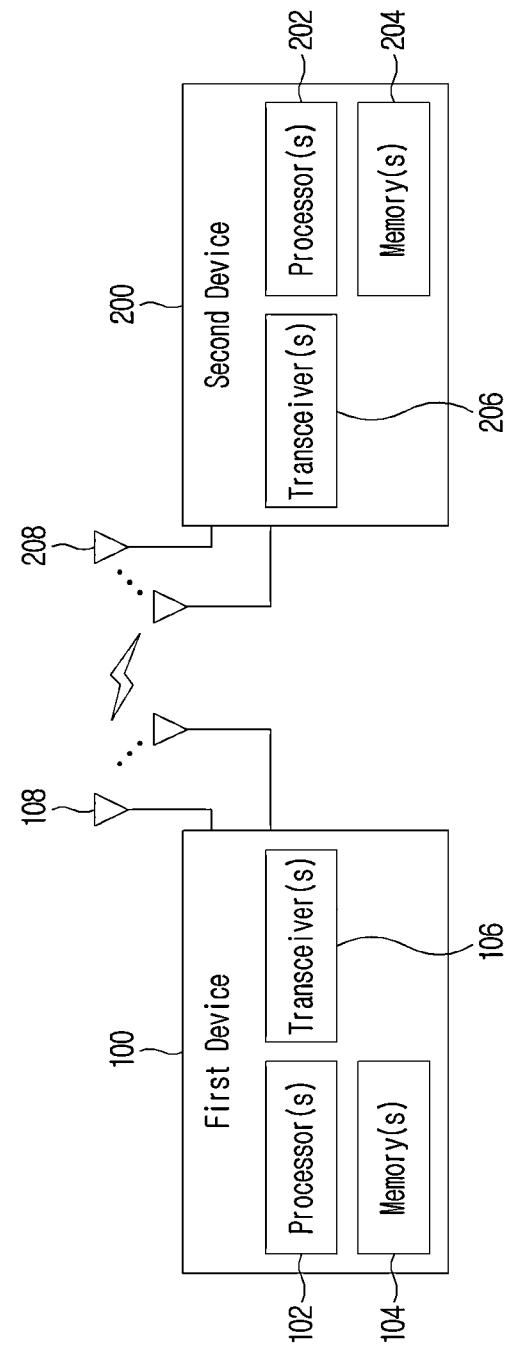
FIG. 12 illustrates a block diagram of a wireless communication device according to an embodiment of the present disclosure.

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a user equipment (UE) in a wireless communication system, the method comprising:
receiving, from a base station, configuration information related to hybrid automatic repeat and request (HARQ)-acknowledgement (ACK) reporting for a multicast physical downlink shared channel (PDSCH), wherein the UE is provided a plurality of group-radio network temporary identifiers (G-RNTIs) related to the multicast PDSCH for a serving cell, and wherein based on the configuration information, one of ACK/negative ACK (NACK) based HARQ-ACK reporting or NACK-only based HARQ-ACK reporting is individually configured for each of the plurality of G-RNTIs;
receiving, from the base station, downlink control information (DCI) with a cyclic redundancy check (CRC) scrambled by a G-RNTI among the plurality of G-RNTIs;
receiving, from the base station, the multicast PDSCH based on the DCI; and
based on the NACK-only based HARQ-ACK reporting being configured for the G-RNTI, transmitting, to the base station, HARQ-ACK information for the multicast PDSCH on a first physical uplink control channel (PUCCH) according to the NACK-only based HARQ-ACK reporting,
wherein based on a specific type HARQ-ACK codebook being configured for the multicast PDSCH, the HARQ-ACK information for the NACK-only based HARQ-ACK reporting is generated according to the specific type HARQ-ACK codebook.

2. The method of claim 1, wherein based on the NACK-only based HARQ-ACK reporting being configured for the G-RNTI, the first PUCCH that includes only the HARQ-ACK information with an ACK is not transmitted.

3. The method of claim 1, further comprising:
receiving PUCCH configuration information for the multicast PDSCH,
wherein a resource of the first PUCCH is determined by a PUCCH resource indicator (PRI) in the DCI among a PUCCH resource set configured by the PUCCH configuration information.

4. The method of claim 3 wherein the PUCCH configuration information for the multicast PDSCH is configured for each common frequency resource (CFR) or for each uplink bandwidth part (BWP) associated with the CFR.

5. The method of claim 4, wherein the resource of the first PUCCH is configured in the CFR in the uplink BWP based on the PUCCH configuration information for the multicast PDSCH.

6. The method of claim 1, wherein based on a plurality of first HARQ-ACKs including the HARQ-ACK information for the multicast PDSCH and a plurality of second HARQACKs for a unicast PDSCH being overlapped in the same slot, the first HARQ-ACKs and the second HARQ-ACKs are bundled and transmitted through the first PUCCH.

7. The method of claim 6, wherein information indicating bundling of the first HARQ-ACKs and the second HARQ-ACKs is transmitted through the first PUCCH.

8. The method of claim 1, wherein based on a plurality of first HARQ-ACKs including the HARQ-ACK information for the multicast PDSCH and a plurality of second HARQACKs for a unicast PDSCH being overlapped in the same slot, some of the first HARQ-ACKs and the second HARQ-ACKs are transmitted through the first PUCCH, and the rest are transmitted through a second PUCCH.

9. The method of claim 8, wherein HARQ-ACKs for a primary cell (PCell) are transmitted through the first PUCCH, and HARQ-ACKs for a secondary cell (SCell) are transmitted through the second PUCCH.

10. The method of claim 8, wherein HARQ-ACKs with high priority are transmitted through the first PUCCH, and HARQ-ACKs with low priority are transmitted through the second PUCCH.

11. The method of claim 8, wherein the first HARQ-ACKs are transmitted through the first PUCCH, and the second HARQ-ACKs are transmitted through the second PUCCH.

12. The method of claim 8, wherein based on a capability of the UE or a maximum PUCCH payload size, Z (Z is a natural number) HARQ-ACKs among the first HARQ-ACKs and the second HARQ-ACKs are transmitted through the first PUCCH and the remaining HARQ-ACKs are transmitted through the second PUCCH.

13. A user equipment (UE) operating in a wireless communication system, the UE comprising:
at least one transceiver for transmitting and receiving a wireless signal; and
at least one processor for controlling the at least one transceiver,
wherein the at least one processor configured to:
receive, from a base station, configuration information related to hybrid automatic repeat and request (HARQ)-acknowledgement (ACK) reporting for a multicast physical downlink shared channel (PDSCH), wherein the UE is provided a plurality of group-radio network temporary identifiers (G-RNTIs) related to the multicast PDSCH for a serving cell, and wherein based on the configuration information, one of ACK/negative ACK (NACK) based HARQ-ACK reporting or NACK-only based HARQ-ACK reporting is individually configured for each of the plurality of G-RNTIs;
receive, from the base station, downlink control information (DCI) with a cyclic redundancy check (CRC) scrambled by a G-RNTI among the plurality of G-RNTIs;
receive, from the base station, the multicast PDSCH based on the DCI; and
based on the NACK-only based HARQ-ACK reporting being configured for the G-RNTI, transmit, to the base station, HARQ-ACK information for the multicast PDSCH on a first physical uplink control channel (PUCCH) according to the NACK-only based HARQ-ACK reporting, wherein based on a specific type HARQ-ACK codebook being configured for the multicast PDSCH, the HARQ-ACK information for the NACK-only based HARQ-ACK reporting is generated according to the specific type HARQ-ACK codebook.

14. A base station operating in a wireless communication system, the base station comprising:
   at least one transceiver for transmitting and receiving a wireless signal; and
   at least one processor for controlling the at least one transceiver,
   wherein the at least one processor configured to:
   transmit, to a user equipment (UE), configuration information related to hybrid automatic repeat and request (HARQ)-acknowledgement (ACK) reporting for a multicast physical downlink shared channel (PDSCH), wherein the UE is provided a plurality of group-radio network temporary identifiers (G-RNTIs) related to the multicast PDSCH for a serving cell, and wherein based on the configuration information, one of ACK/negative ACK (NACK) based HARQ-ACK reporting or NACK-only based HARQ-ACK reporting is individually configured for each of the plurality of G-RNTIs;
   transmit, to the UE, downlink control information (DCI) with a cyclic redundancy check (CRC) scrambled by a G-RNTI among the plurality of G-RNTIs;
   transmit, to the UE, the multicast PDSCH based on the DCI; and
   based on the NACK-only based HARQ-ACK reporting being configured for the G-RNTI, receive, from the UE, HARQ-ACK information for the multicast PDSCH on a first physical uplink control channel (PUCCH) according to the NACK-only based HARQ-ACK reporting,
   wherein based on a specific type HARQ-ACK codebook being configured for the multicast PDSCH, the HARQ-ACK information for the NACK-only based HARQ-ACK reporting is generated according to the specific type HARQ-ACK codebook.

* * * * *